(12) United States Patent
Kaneko et al.

(10) Patent No.: US 8,225,594 B2
(45) Date of Patent: Jul. 24, 2012

(54) CONTROL DEVICE OF AN INTERNAL COMBUSTION ENGINE

(75) Inventors: Naoya Kaneko, Susono (JP); Shigeki Miyashita, Susono (JP); Kenji Harima, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 363 days.

(21) Appl. No.: 12/532,846

(22) PCT Filed: Mar. 14, 2008

(86) PCT No.: PCT/JP2008/054766
§ 371 (c)(1),
(2), (4) Date: Sep. 30, 2009

(87) PCT Pub. No.: WO2008/120560
PCT Pub. Date: Oct. 9, 2008

(65) Prior Publication Data
US 2010/0037595 A1    Feb. 18, 2010

(30) Foreign Application Priority Data
Apr. 2, 2007 (JP) ................................ 2007-096266

(51) Int. Cl.
*F01N 3/00* (2006.01)
(52) U.S. Cl. ................. 60/277; 60/285; 60/295; 60/276
(58) Field of Classification Search ............... 60/285, 60/295, 296, 286, 276, 277
See application file for complete search history.

(56) References Cited

U.S. PATENT DOCUMENTS
6,014,859 A    1/2000    Yoshizaki et al.

FOREIGN PATENT DOCUMENTS

| JP | 7 158426    | 6/1995 |
|----|-------------|--------|
| JP | 10 89106    | 4/1998 |
| JP | 11 62563    | 3/1999 |
| JP | 2000 73790  | 3/2000 |
| JP | 2000 265833 | 9/2000 |
| JP | 2002 047954 | 2/2002 |
| JP | 2002 161736 | 6/2002 |

*Primary Examiner* — Thomas Denion
*Assistant Examiner* — Abdul Elnoubi
(74) *Attorney, Agent, or Firm* — Oblon, Spivak, McClelland, Maier & Neustadt, L.L.P.

(57) ABSTRACT

The control device of the internal combustion engine appropriately controls plural exhaust valves to effectively perform sulfur poisoning recovery in an exhaust gas purifying catalyst. The control device controls the internal combustion engine which performs lean burn. The exhaust system of the internal combustion engine includes: first exhaust valves and second exhaust valves provided in each of the plural cylinders; a first exhaust passage communicating with the first exhaust valves; a second exhaust passage communicating with the second exhaust valves; a first exhaust gas purifying catalyst provided at least one of the first exhaust passage and the second exhaust passage; and a second exhaust gas purifying catalyst provided on an exhaust passage downstream of a junction of the first exhaust passage and the second exhaust passage. The control means controls the exhaust valves such that an effect of rich combustion occurs more to the second exhaust gas purifying catalyst than to the first exhaust gas purifying catalyst, when performing rich combustion. By this, the consumption of the exhaust gas in the first exhaust gas purifying catalyst can be suppressed, and the temperature of the second exhaust gas purifying catalyst can be effectively risen. Therefore, the sulfur poisoning recovery and the like can be effectively performed.

10 Claims, 12 Drawing Sheets

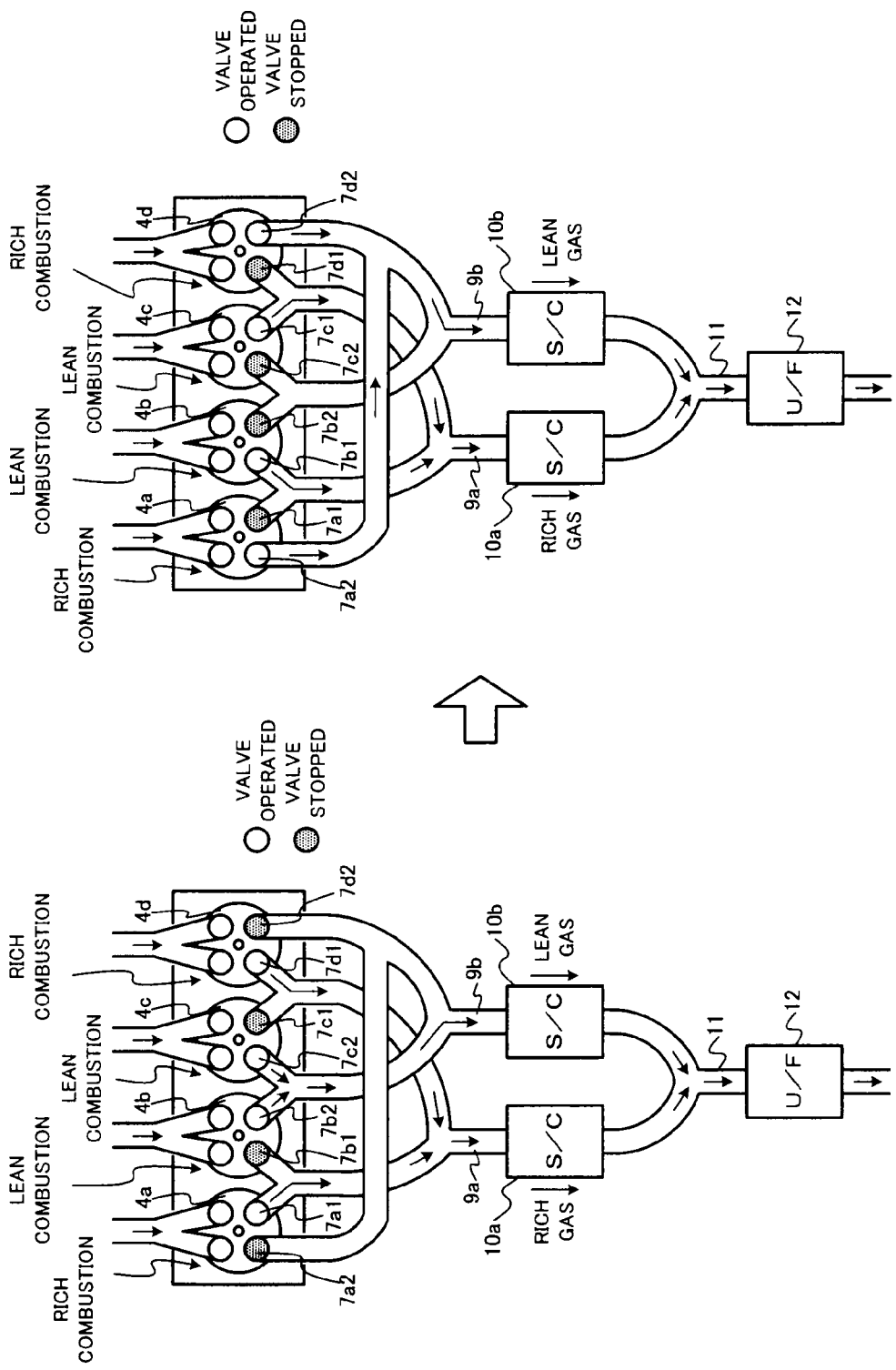

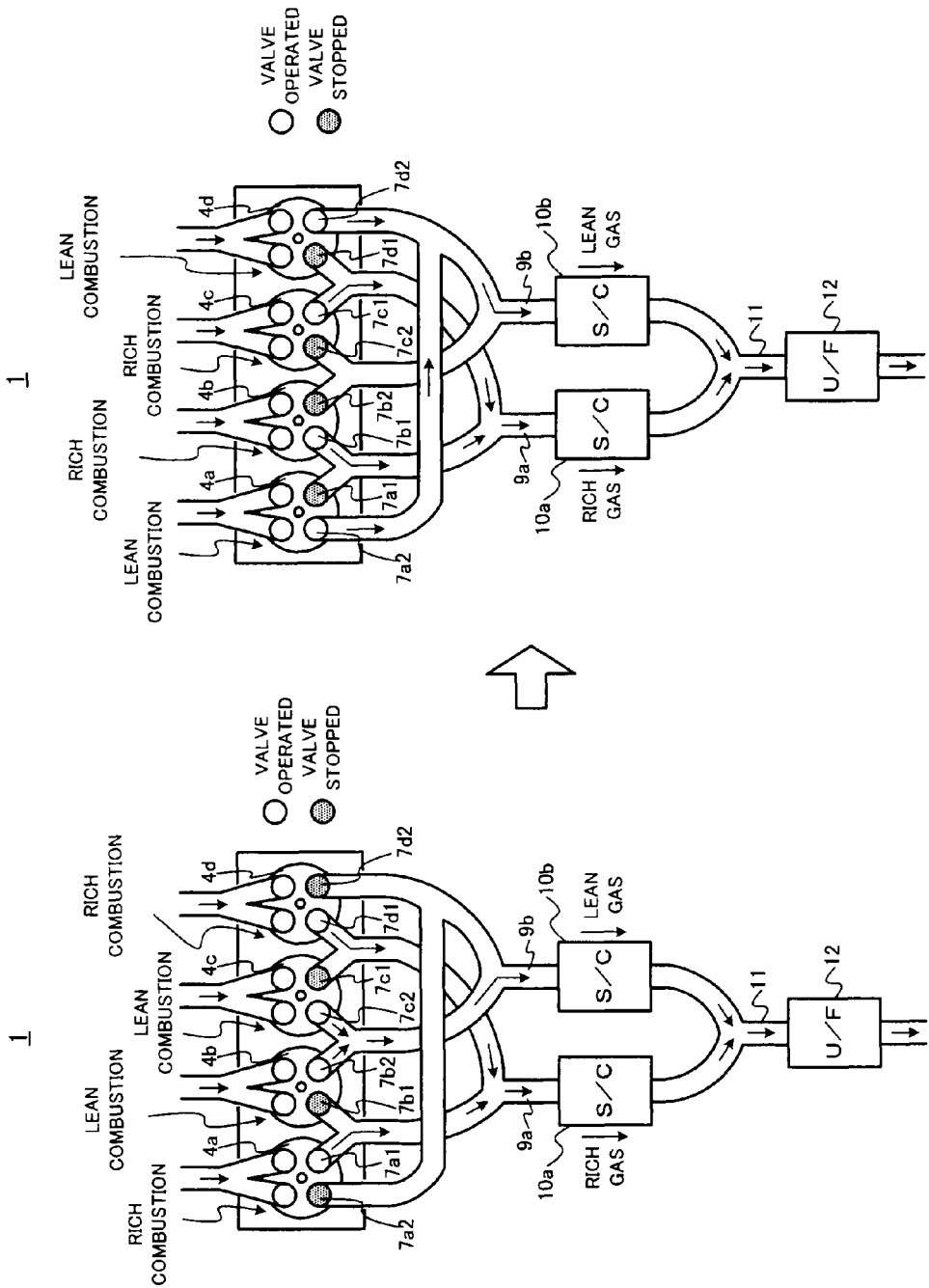

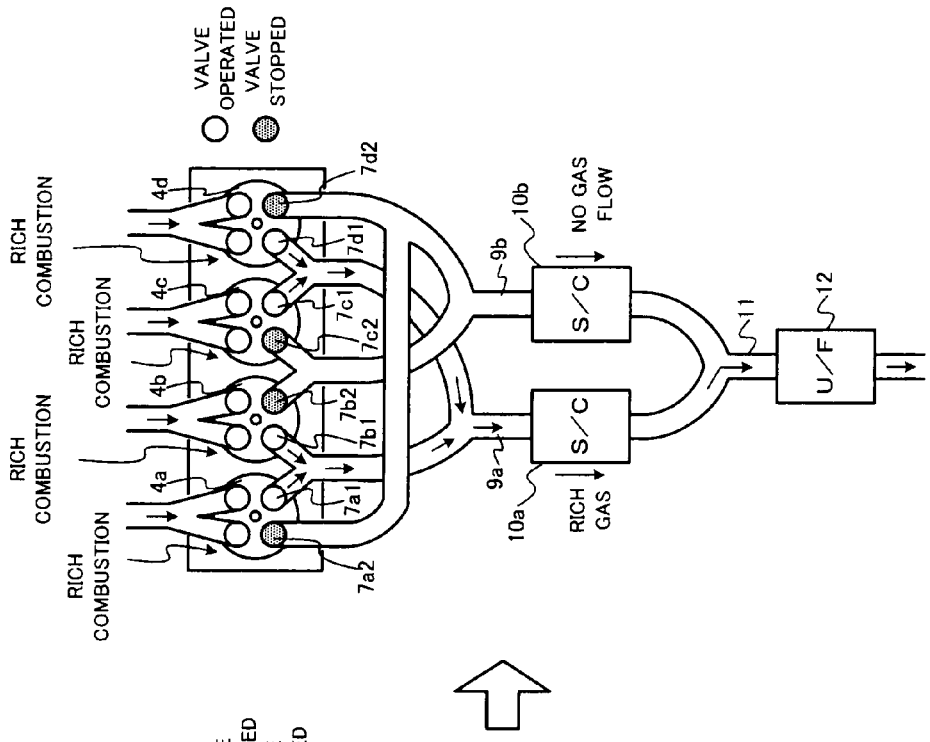
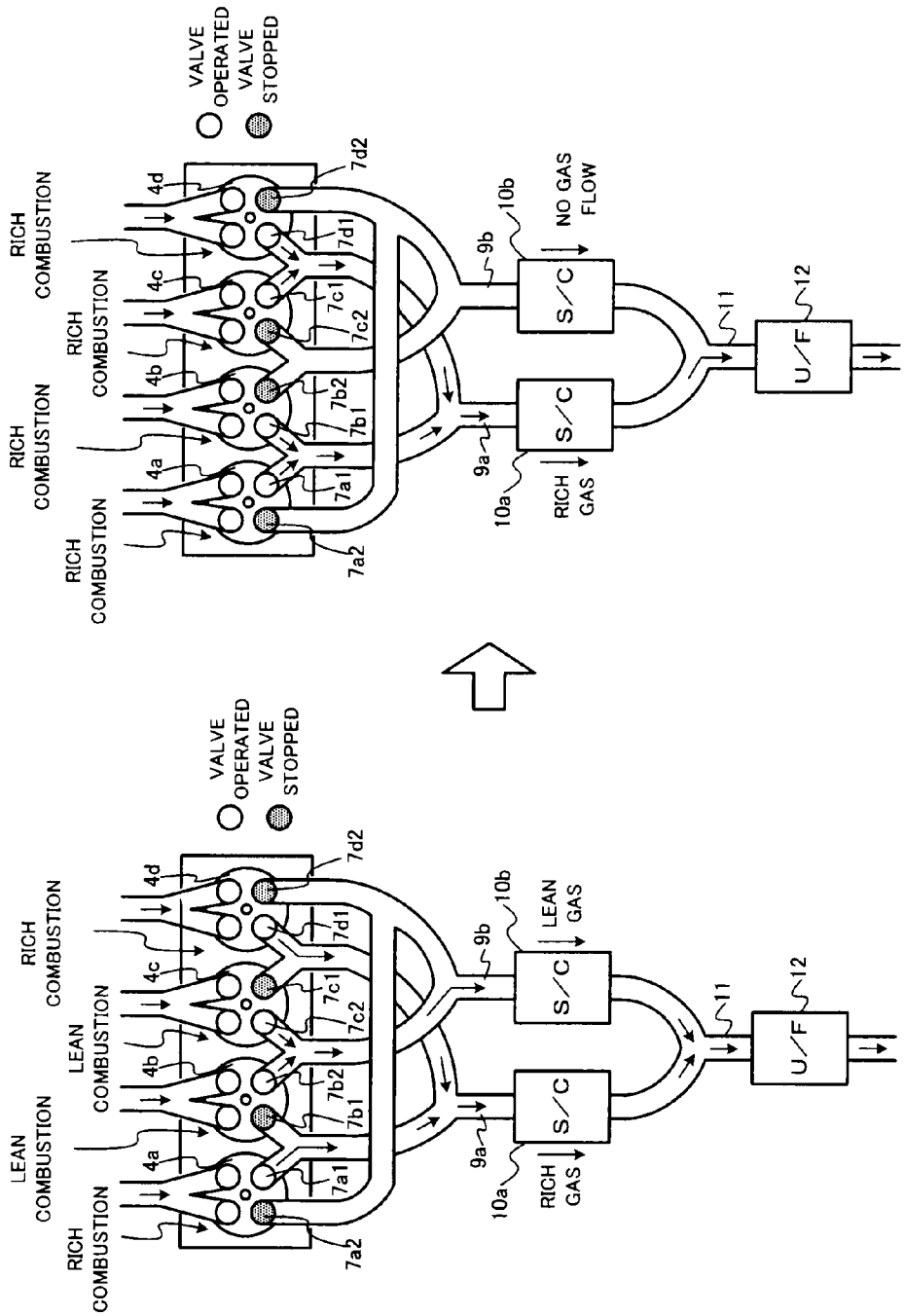
FIG. 6A
FIG. 6B

CONTROL DEVICE OF AN INTERNAL COMBUSTION ENGINE

TECHNICAL FIELD

The present invention relates to a control device of an internal combustion engine which controls an internal combustion engine in which a plurality of exhaust valves are provided for each of a plurality of cylinders and an exhaust passage is connected to each plurality of exhaust valves.

BACKGROUND TECHNIQUE

Conventionally, in an internal combustion engine in which a plurality of exhaust valves are provided for each of a plurality of cylinders and an exhaust passage is connected to each plurality of exhaust valves, there is proposed a control for those plurality of exhaust valves. For example, in Patent Reference-1, there is disclosed a technique of opening a first exhaust valve in a second half of the exhaust stroke and opening a second exhaust valve in a first half of the exhaust stroke in an engine which includes, for each of cylinders, the first exhaust valve for opening and closing the exhaust passage passing through a turbine and the second exhaust valve for opening and closing the exhaust passage not passing through the turbine. Also, in Patent Reference-2, there is disclosed a technique of stopping one of the valves in each cylinder by using an electromagnetic driving valve, i.e., performing one-side valve stopping drive of the exhaust valve, in order to achieve early activation of the catalyst.

However, in the techniques disclosed in the Patent Reference-1 and Reference-2, there is no disclosure for the catalyst control in an internal combustion engine performing lean burn (i.e., the control for recovering the catalyst purifying performance). Also, in the techniques disclosed in the Patent Reference-1 and Reference-2, there is not disclosed a control method for a system which includes an exhaust gas purifying catalyst provided on the exhaust passages connected to each plurality of exhaust valves and an exhaust gas purifying catalyst provided on the exhaust passage after the junction of those exhaust passages.

Patent Reference-1: Japanese Patent Application Laid-open under No. H10-89106
Patent Reference-2: Japanese Patent Application Laid-open under No. 2000-73790

DISCLOSURE OF INVENTION

Problem to be Solved by the Invention

The present invention is achieved to solve the above-mentioned problem, and it is an object of the present invention to provide a control device of an internal combustion engine, capable of effectively performing the recovery from sulfur poisoning and the NOx reduction in an exhaust gas purifying catalyst provided on an exhaust passage after the junction of plural exhaust passages, by appropriately controlling a plurality of exhaust valves.

Means for Solving the Problem

According to one aspect of the present invention, there is provided a control device of an internal combustion engine, which controls the internal combustion engine performing lean burn and comprising plural cylinders and an exhaust system, the exhaust system comprising: first exhaust valves and second exhaust valves provided in each of the plural cylinders; a first exhaust passage communicating with the first exhaust valves; a second exhaust passage communicating with the second exhaust valves; a first exhaust gas purifying catalyst provided at least one of the first exhaust passage and the second exhaust passage; and a second exhaust gas purifying catalyst provided on an exhaust passage downstream of a junction of the first exhaust passage and the second exhaust passage, the control device comprising a control means which controls the first exhaust valves and the second exhaust valves such that an effect of rich combustion occurs more to the second exhaust gas purifying catalyst than to the first exhaust gas purifying catalyst, when a part of the plural cylinder performs the rich combustion.

The above control device of the internal combustion engine is preferably used for controlling the internal combustion engine having plural cylinders and performing lean burn. The exhaust system of the internal combustion engine includes: first exhaust valves and second exhaust valves provided in each of the plural cylinders; a first exhaust passage communicating with the first exhaust valves; a second exhaust passage communicating with the second exhaust valves; a first exhaust gas purifying catalyst provided at least one of the first exhaust passage and the second exhaust passage; and a second exhaust gas purifying catalyst provided on an exhaust passage downstream of a junction of the first exhaust passage and the second exhaust passage. The control means controls the first exhaust valves and the second exhaust valves such that an effect (such as temperature rising effect) of rich combustion occurs more to the second exhaust gas purifying catalyst than to the first exhaust gas purifying catalyst, when a part of the plural cylinder performs the rich combustion. By performing such a control, it can be suppressed that the exhaust gas is consumed by the reaction and the like in the first exhaust gas purifying catalyst, and the effect of the rich combustion can be appropriately given to the second exhaust gas purifying catalyst. Therefore, it can be suppressed that the first exhaust gas purifying catalyst is deteriorated, and the temperature rising failure in the second exhaust gas purifying catalyst due to the lowered heat generation can be suppressed. Thus, according to the above control device of the internal combustion engine, the sulfur poisoning recovery and the NOx reduction in the second exhaust gas purifying catalyst can be effectively performed.

According to one mode of the above control device of the internal combustion engine, the control means performs a S-poisoning regeneration control in which the control means makes a part of the plural cylinders perform stoichiometric combustion or rich combustion and makes remainder of the plural cylinders perform lean combustion, and the control means stops one of the first exhaust valves and the second exhaust valves provided in each of the plural cylinders and operates the other of the first exhaust valves and the second exhaust valves, at a time of the S-poisoning regeneration control, such that only one of exhaust gas from the cylinder performing the stoichiometric combustion or the rich combustion and exhaust gas from the cylinder performing the lean combustion flows into the first exhaust gas purifying catalyst.

In this mode, when the first exhaust gas purifying catalyst is provided on the first exhaust gas passage and the second exhaust gas passage, for example, the control means controls the exhaust valves such that only one of the rich gas or the lean gas is supplied to the respective first exhaust gas purifying catalysts, at the time of the S-poisoning regeneration control. By this, it can be prevented that HC and CO in the rich gas react with $O_2$ in the lean gas in the first exhaust gas purifying catalyst, it can be suppressed that the first exhaust gas purifying catalyst becomes remarkably high in temperature to be deteriorated, and the temperature rising failure in the second exhaust gas purifying catalyst due to the lowered heat generation can be effectively suppressed. Therefore, the S-poisoning regeneration efficiency can be enhanced.

According to another mode of the above control device of the internal combustion engine, the control means performs a control of switching an exhaust valve to be operated and an exhaust valve to be stopped, every time period, for each of the first exhaust valves and the second exhaust valves provided on the plural cylinders, while maintaining a combustion state of the cylinder performing the stoichiometric combustion or the rich combustion and the cylinder performing the lean combustion. By this, the rich gas and the lean gas supplied to the first exhaust gas purifying catalyst can be switched. Therefore, the clogging due to "soot" in the first exhaust gas purifying catalyst to which the rich gas has been supplied can be prevented, and the heat deterioration of the first exhaust gas purifying catalyst to which the lean gas has been supplied can be prevented. Also, since the combustion state in the cylinders can be generally constant, the drivability can be stabilized.

According to still another mode of the above control device of the internal combustion engine, the control means switches the combustion state for each of the cylinder performing the stoichiometric combustion or the rich combustion and the cylinder performing the lean combustion, when performing the control of switching the exhaust valve to be operated and the exhaust valve to be stopped. By this, the rich gas and the lean gas supplied to the first exhaust gas purifying catalyst can be constant, and the deterioration of the first exhaust gas purifying catalyst, to which almost all exhaust gas is flown at the time of starting the internal combustion engine, can be effectively prevented. Also, by switching the cylinder to perform the rich combustion and the cylinder to perform the lean combustion, the smoking in each cylinder can be prevented.

According to still another mode of the above control device of the internal combustion engine, the control means performs a control of switching an exhaust valve to be operated and an exhaust valve to be stopped, for each of the first exhaust valves and the second exhaust valves provided in the cylinder performing the stoichiometric combustion or the rich combustion, when performing a fuel cut control during the S-poisoning regeneration control or within a predetermined time period from an end of the S-poisoning regeneration control. By this, at the time of the fuel cut control, the exhaust gas including only air can be supplied to the first exhaust gas purifying catalyst to which lean gas has been originally supplied. Therefore, at the time of fuel cut control, it can be prevented that the exhaust gas including only air is supplied to the first exhaust gas purifying catalyst to which rich gas has been originally supplied, and the deterioration of the first exhaust gas purifying catalyst can be effectively prevented.

According to still another mode of the above control device of the internal combustion engine, the control means performs a control of switching an exhaust valve to be operated and an exhaust valve to be stopped, for each of the first exhaust valves and the second exhaust valves provided in the cylinder performing the lean combustion, when performing a restart of the internal combustion engine for an economic running. By this, at the time of restarting the internal combustion engine for the economic running, all the rich gas can be supplied to the first exhaust gas purifying catalyst to which the rich gas has been originally supplied. Since the first exhaust gas purifying catalyst to which the rich gas has been originally supplied has relatively small oxygen storage quantity, high NOx purification rate can be expected. Therefore, by supplying all the rich gas to the first exhaust gas purifying catalyst, the deterioration of NOx emission can be effectively suppressed. Further, it can be prevented that the rich gas is supplied to the first exhaust gas purifying catalyst to which the lean gas has been originally supplied, and the deterioration of the first exhaust gas purifying catalyst can be effectively prevented.

According to still another mode of the above control device of the internal combustion engine, the control means performs a control of switching an exhaust valve to be operated and an exhaust valve to be stopped, for each of the first exhaust valves and the second exhaust valves provided in the cylinder performing the lean combustion, when switching the combustion state of all the cylinders from the combustion state at the time of the S-poisoning regeneration control to the stoichiometric combustion. By this, the deterioration of NOx emission can be effectively suppressed.

According to still another mode of the above control device of the internal combustion engine, the control means performs a S-poisoning regeneration control in which the control means makes a part of the plural cylinders perform stoichiometric combustion or rich combustion and makes remainder of the plural cylinders perform lean combustion, and the control means stops one of the first exhaust valves and the second exhaust valves provided in each of the plural cylinders and operates the other of the first exhaust valves and the second exhaust valves, at a time of the S-poisoning regeneration control, such that exhaust gas does not flow into the first exhaust gas purifying catalyst.

In this mode, when the first exhaust gas purifying catalyst is provided only one of the first exhaust passage and the second exhaust passage, for example, at the time of the S-poisoning regeneration control, the control means controls the exhaust valves such that all the exhaust gas flows into the exhaust passage on which the first exhaust gas purifying catalyst is not provided. Namely, at the time of the S-poisoning regeneration control, the control means performs the control so that the supply of the exhaust gas to the first exhaust gas purifying catalyst is cut off. By this, it can be suppressed that the exhaust gas is consumed by the reaction and the like in the first exhaust gas purifying catalyst, and the S-poisoning regeneration efficiency for the second exhaust gas purifying catalyst can be enhanced (Namely, the temperature of the second exhaust gas purifying catalyst can be effectively risen). Also, by performing such a control, the temperature control width of the second exhaust gas purifying catalyst with respect to the A/F control width at the time of the S-poisoning regeneration control can be broadened.

According still another mode of the above control device of the internal combustion engine, the control means performs a rich-spike control in which the control means makes all the cylinder perform the rich combustion so as to perform NOx reduction of the second exhaust gas purifying catalyst, and the control means stops one of the first exhaust valves and the second exhaust valves provided in each of the plural cylinders and operates the other of the first exhaust valves and the second exhaust valves, at a time of the rich-spike control, such that exhaust gas does not flow into the first exhaust gas purifying catalyst.

In this mode, when the first exhaust gas purifying catalyst is provided on only one of the first exhaust passage and the second exhaust passage, for example, at the time of the rich-spike control, the control means controls the exhaust valves such that all the exhaust gas is supplied to the exhaust passage on which the first exhaust gas purifying catalyst is not provided. Namely, at the time of the rich-spike control, the control means performs the control such that the supply of the exhaust gas to the first exhaust gas purifying catalyst is cut off. By this, it can be suppressed that the reducer is consumed in the first exhaust gas purifying catalyst, and the NOx reduction rate for the second exhaust gas purifying catalyst can be enhanced. In addition, the deterioration of the fuel consumption at the time of the rich-spike control can be suppressed.

BRIEF DESCRIPTION OF THE DRAWINGS

FIGS. 3A and 3B are diagrams for specifically explaining a method of controlling the exhaust valves according to a first example;

FIGS. 4A and 4B are diagrams for specifically explaining a method of controlling the exhaust valves according to a second example;

FIGS. 6A and 6B are diagrams for specifically explaining a method of controlling the exhaust valves according to a fourth example;

BRIEF DESCRIPTION OF REFERENCE NUMBERS

1 Internal combustion engine
3 Intake passage
4 Cylinder
$7a1$, $7b1$, $7c1$, $7d1$ First exhaust valve
$7a2$, $7b2$, $7c2$, $7d2$ Second exhaust valve
$9a$ First exhaust passage
$9b$ Second exhaust passage
$10a$, $10b$ Start catalyst
11 Exhaust passage
12 Underfloor catalyst (U/F catalyst)
50 ECU

BEST MODE FOR EXERCISING THE INVENTION

Preferred embodiments of the present invention will be described below with reference to the attached drawings.

<1st Embodiment>

First, the first embodiment of the invention will be described.

(Configuration of Internal Combustion Engine)

Figure 1:
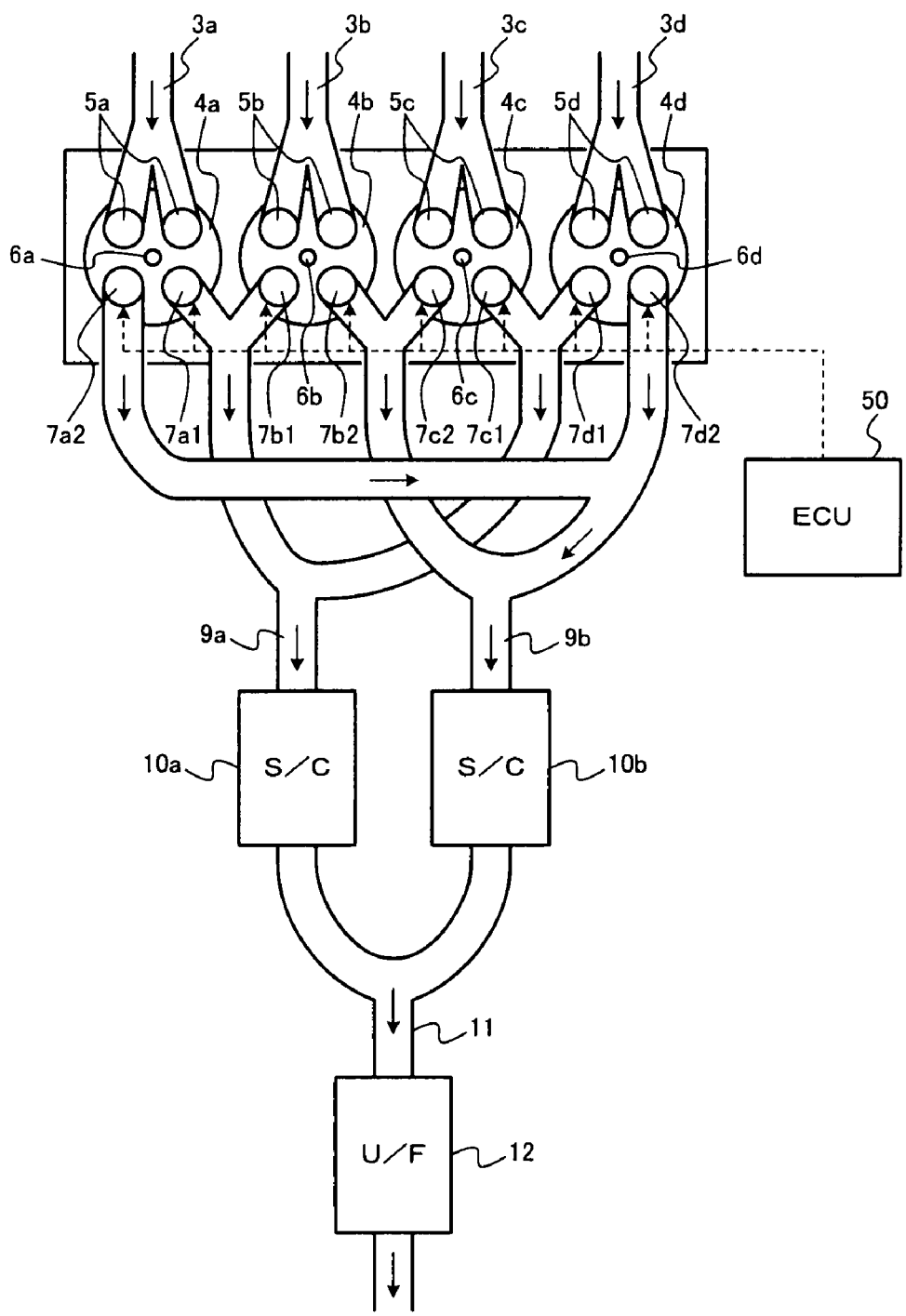
FIG. 1 is a diagram showing a schematic configuration of an internal combustion engine according to a first embodiment.

FIG. 1 is a diagram showing a schematic configuration of an internal combustion engine 1 to which the control apparatus of the internal combustion engine according to the first embodiment is applied. In FIG. 1, the solid line arrows show the examples of the gas flow, and the broken line arrow shows the input/output of a signal.

The internal combustion engine 1 mainly includes intake passages $3a$ to $3d$, cylinders $4a$ to $4d$, intake valves $5a$ to $5d$, sparking plugs $6a$ to $6d$, first exhaust valves $7a1$ to $7d1$, second exhaust valves $7b1$ to $7d1$, a first exhaust passage $9a$, a second exhaust passage $9b$, start catalysts (S/C) $10a$ and $10b$, an exhaust passage 11 and an underfloor catalyst (hereinafter referred to as "U/F catalyst") 12. In the following description, the subscripts "a", "b", "c", "d" added to the reference number of the constitutional elements will be omitted if those constitutional elements are not distinguished from each other. Also, the first exhaust valves $7a1$ to $7d1$ and the second exhaust valves $7a2$ to $7d2$ will be simply expressed as "the exhaust valve 7" if they are not distinguished from each other.

The internal combustion engine 1 is formed as a straight engine in which four cylinders $4a$ to $4d$ are arranged in series. To the cylinders $4a$ to $4d$, the intake air (air) is supplied from the intake passages $3a$ to $3d$. The internal combustion engine 1 generates power by burning the mixture of the intake air thus supplied and the fuel supplied by the fuel injection valve (not shown) in the cylinders $4a$ to $4d$. In this case, the combustion is performed by the ignition by the sparking plugs $6a$ to $6d$ provided in the cylinders $4a$ to $4d$. Also, by the opening/closing of the intake valves $5a$ to $5d$ provided on the intake passages $3a$ to $3d$, the supply of the intake air to the cylinders $4a$ to $4d$ is controlled. The internal combustion engine 1 basically performs lean burn. The internal combustion engine 1 may be installed on a hybrid vehicle.

Further, two exhaust valves 7 (the first exhaust valves $7a1$ to $7d1$ and the second exhaust valves $7b2$ to $7d2$) are provided in each of the four cylinders $4a$ to $4d$. The first exhaust valves $7a1$ to $7d1$ and the second exhaust valves $7a2$ to $7d2$ are configured such that each of them can be operated and stopped independently. The exhaust gas generated by the combustion in the cylinders $4a$ to $4d$ is ejected to the first exhaust passage $9a$ and/or the second exhaust passage $9b$ via the exhaust valves 7. Specifically, the first exhaust passage $9a$ communicates with the first exhaust valves $7a1$ to $7d1$, and the second exhaust passage $9b$ communicates with the second exhaust valves $7a2$ to $7d2$. The opening and closing of the first exhaust valves $7a1$ to $7d1$ and the second exhaust valves $7a2$ to $7d2$ are controlled by the ECU 50. Specifically, the ECU 50 controls the switching of the exhaust valves 7 to be operated and the exhaust valves 7 to be stopped.

On the first exhaust passage $9a$ and the second exhaust passage $9b$, the start catalysts $10a$ and $10b$ are provided, respectively. For example, the start catalysts $10a$ and $10b$ are formed by a three way catalyst capable of purifying hydrocarbon (HC), carbon monoxide (CO) and nitrogen oxides (NOx). Further, the first exhaust passage $9a$ and the second exhaust passage $9b$ join with each other at the position downstream of the start catalysts $10a$ and $10b$ to be connected to the exhaust passage 11. On the exhaust passage 11, the U/F catalyst 12 is provided. For example, the U/F catalyst 12 is formed by a NOx catalyst (NSR(NOx Storage Reduction) catalyst) having a function of storing NOx in the exhaust gas and reducing the stored NOx. The start catalysts $10a$ and $10b$ correspond to the first exhaust gas purifying catalyst, and the U/F catalyst 12 corresponds to the second exhaust gas purifying catalyst.

The ECU (Engine Control Unit) 50 includes a CPU (Central Processing Unit), a ROM (Read Only Memory) and a RAM (Random Access Memory), which are not shown, and is an electronic control unit which controls the constitutional elements in the internal combustion engine 1. In the first embodiment, the ECU 50 mainly controls the combustion state (stoichiometric combustion, rich combustion and lean combustion) in each of the cylinders 4a to 4d by adjusting the air-fuel ratio and the fuel injection amount, and controls the switching of operation/stop of the exhaust valves 7 provided in each of the cylinders 4a to 4d. Specifically, the ECU 50 controls the combustion state and controls the exhaust valves 7 so that the Sulfur poisoning recovery (Sulfur poisoning regeneration) in the U/F catalyst 12 is effectively performed. More specifically, the ECU 50 controls the exhaust valves 7 so that the U/F catalyst 12 receives more effect by the rich combustion than the start catalyst 10 in case of performing the rich combustion in a part of the cylinders 4a to 4d.

As described above, the ECU 50 corresponds to the control device of the internal combustion engine according to the invention. Specifically, the ECU 50 functions as the control means. Although the ECU 50 performs the control of other constitutional elements in the internal combustion engine 1, the description not related to the present invention will be omitted.

(Control Method of Exhaust Valves)

Next, the description will be specifically given of the control method of exhaust valves 7 (the first exhaust valves 7a1 to 7d1 and the second exhaust valves 7a2 to 7d2) performed in the first embodiment. In the first embodiment, when the ECU 50 makes a part of the cylinders 4a to 4d perform the rich combustion, it controls the exhaust valves 7 such that the effect of the rich combustion occurs more to U/F catalyst 12 than to the start catalyst 10. Specifically, the ECU 50 controls the exhaust valves 7 such that the temperature rising effect caused by the rich combustion occurs more to the U/F catalyst 12 than to the start catalyst 10.

Specifically, the ECU 50 performs the control (hereinafter referred to as "S-poisoning regeneration control") to rise the temperature of the U/F catalyst 12 so as to recover the U/F catalyst 12 from the sulfur (S) poisoning. In this case, as the S-poisoning regeneration control, the ECU 50 makes one or some of the four cylinders 4a to 4d perform the rich combustion (accurately, from the stoichiometric combustion to the rich combustion) and makes the remaining cylinders 4a to 4d to perform the lean combustion. Thus, the ECU 50 makes the air-fuel ratio of the exhaust gas supplied to the U/F catalyst 12 stoichiometric to cause the reaction in the U/F catalyst 12. Thereby, the temperature of the U/F catalyst 12 rises and the U/F catalyst is recovered from the sulfur poisoning.

Further, in the first embodiment, at the time of performing the S-poisoning regeneration control, the ECU 50 controls the exhaust valves 7 such that the exhaust gas from the cylinder 4 in the rich combustion state (hereinafter referred to as "rich gas") and the exhaust gas from the cylinder 4 in the lean combustion state (hereinafter referred to as "lean gas") do not flow into the start catalyst 10a and/or the start catalyst 10b with the amount ratio of "1:1". More specifically, the ECU 50 controls to stop one of the first exhaust valves 7a1 to 7d1 and the second exhaust valves 7a2 to 7d2 provided at each of the cylinders 4a to 4d and operates the other of them so that only one of the rich gas and the lean gas flows into the start catalysts 10a and 10b, respectively. By this, it can be prevented that HC and CO in the rich gas wholly react with $O_2$ in the lean gas. Therefore, it can be suppressed that the start catalyst becomes extremely high in temperature to be deteriorated and the heat generation in the U/F catalyst 12 is lowered to cause the temperature rising failure.

Figure 2:
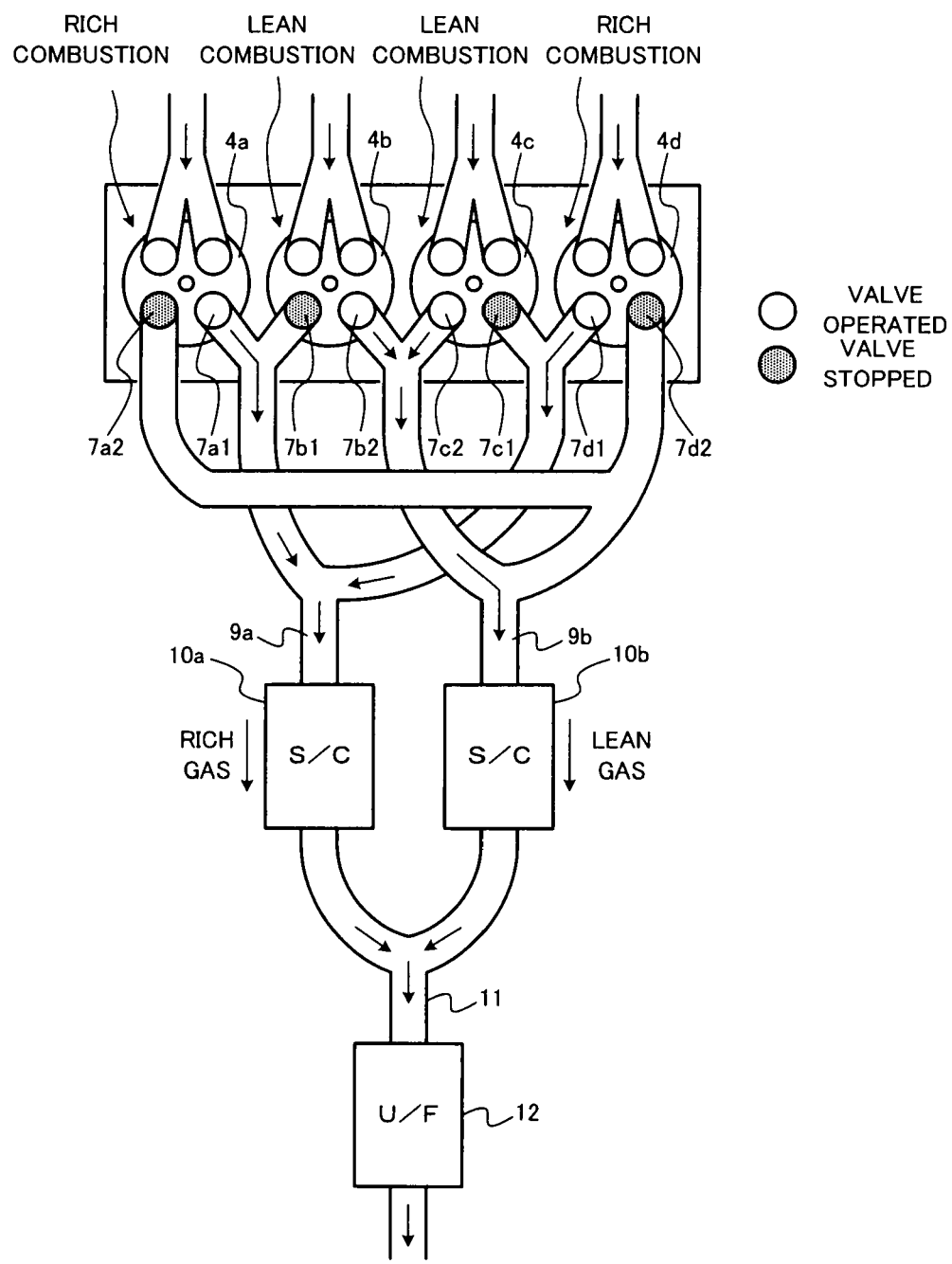
FIG. 2 is a diagram for specifically explaining a method of controlling exhaust valves according to the first embodiment.

FIG. 2 is a diagram for specifically explaining the control method of the exhaust valves 7 according to the first embodiment. FIG. 2 shows the schematic configuration of the internal combustion engine 1 similar to that shown in FIG. 1. The hatched exhaust valves 7 are in the stopped state, and the non-hatched exhaust valves 7 are in the operating state. In the following figures, the exhaust valves 7 are illustrated in the same manner.

In this case, the ECU 50 makes the cylinders 4a and 4b perform the rich combustion, and makes the cylinders 4b and 4c perform the lean combustion. Namely, in order to recover the U/F catalyst 12 from the sulfur poisoning, the ECU 50 executes the S-poisoning regeneration control. Then, when executing the S-poisoning regeneration control, the ECU 50 controls the exhaust valves 7 such that the exhaust gas (rich gas) from the cylinders 4a and 4d performing the rich combustion is wholly supplied to the start catalyst 10a and the exhaust gas (lean gas) from the cylinders 4b and 4c performing the lean combustion is wholly supplied to the start catalyst 10b. Specifically, the ECU 50 makes the first exhaust valve 7a1 operate and makes the second exhaust valve 7a2 stop in the cylinder 4a. Similarly, the ECU 50 makes the first exhaust valve 7b1 stop and makes the second exhaust valve 7b2 operate in the cylinder 4b, makes the first exhaust valve 7c1 stop and makes the second exhaust valve 7c2 operate in the cylinder 4c, and makes the first exhaust valve 7d1 operate and makes the second exhaust valve 7d2 stop in the cylinder 4d.

By controlling the exhaust valves 7 in this way, only the rich gas is supplied to the start catalyst 10a and only the lean gas is supplied to the start catalyst 10b at the time of the S-poisoning regeneration control. Namely, it is possible to suppress that the rich gas and the lean gas flow into the start catalyst 10a and/or the start catalyst 10b with the amount ratio of 1:1. Therefore, it can be prevented that HC and CO in the rich gas react with $O_2$ in the lean gas in the start catalyst 10. As a result, it is possible to suppress that the start catalyst 1 becomes remarkably high in temperature to be deteriorated, and it is possible to suppress the temperature rising failure due to the lowered heat generation in the U/F catalyst 12. In addition, since the exhaust gas passed through the start catalyst 10 can be supplied to the U/F catalyst 12, the emission purification of three components, i.e., HC, CO and NOx can be expected.

The above description showed an example of controlling the exhaust valves 7 such that only the rich gas is supplied to the start catalyst 10a and only the lean gas is supplied to the start catalyst 10b at the time of the S-poisoning regeneration control, but the present invention is not limited to this example. Unless the rich gas and the lean gas are supplied to the start catalyst 10 with the amount ratio of 1:1, the present invention is not limited to the control of exhaust valves 7 to supply only the rich gas to one of the start catalysts 10 and supply only the lean gas to the other of the start catalysts 10. In other words, both the rich gas and the lean gas may be supplied to the start catalysts 10 at the time of the S-poisoning regeneration control. For example, the ECU 50 may control the exhaust valves 7, at the time of the S-poisoning regeneration control, such that the rich gas from the cylinders 4a and 4d performing the rich combustion and the lean gas from the cylinder 4b performing the lean combustion are supplied to the start catalyst 10a and the lean gas from the cylinder 4c performing the lean combustion is wholly supplied to the start catalyst 10b.

Further, the control method of the exhaust valves 7 according to the first embodiment is not limitedly applied to the internal combustion engine 1 of a natural air intake type, and may be applied to an internal combustion engine having a turbo charger. For example, the internal combustion engine may be configured to provide a turbo charger on the first exhaust passage 9a at the upstream of the start catalyst 10a.

Hereinafter, the description will be given of the examples of the control of switching the operation/stop of the exhaust valves 7 during or after the S-poisoning regeneration control.

1st EXAMPLE

Here, a first example of the control method of the exhaust valves 7 performed in the first embodiment will be described. In the first example, while performing the control of the exhaust valves 7 at the time of the S-poisoning regeneration control, the ECU 50 maintains the combustion state of the cylinder 4 performing the rich combustion and the lean combustion, and switches the exhaust valves 7 to be operated and the exhaust valves 7 to be stopped every predetermined time period.

FIGS. 3A and 3B are diagrams for specifically explaining the control method of the exhaust valves 7 according to the first example. Specifically, FIG. 3A is a diagram similar to FIG. 2, and FIG. 3B shows the state after executing the control of the first example from the state shown in FIG. 3A.

In the first example, the ECU 50 performs the control of switching the exhaust valves 7 to be operated and the exhaust valves 7 to be stopped every predetermined time period at the time of the S-poisoning regeneration control. Specifically, if the ECU 50 executes the control of the first example from the state shown in FIG. 3A, in the cylinders 4a and 4b, it stops the first exhaust valves 7a1 and 7d1 which has been operating and operates the second exhaust valves 7a2 and 7d2 which has been stopped as shown in FIG. 3B. Similarly, in the cylinders 4b and 4c, the ECU 50 operates the first exhaust valves 7b1 and 7c1 which has been stopped and stops the second exhaust valves 7b2 and 7c2 which has been operating. By this control, the rich gas and the lean gas supplied to the start catalysts 10 are switched. Specifically, while the rich gas is supplied to the start catalyst 10a and the lean gas is supplied to the start catalyst 10b in FIG. 3A, the lean gas is supplied to the start catalyst 10a and the rich gas is supplied to the start catalyst 10b as shown in FIG. 3B by the above control of the first example.

By performing the above described control, the rich gas and the lean gas to be supplied to the start catalysts 10 can be switched. Therefore, the clogging, due to soot, of the start catalysts 10 to which the rich gas has been supplied can be prevented, and the heat deterioration of the start catalysts 10 to which the lean gas has been supplied can be suppressed. Also, since it is not necessary to switch the combustion states in the cylinders 4 in order to switch the rich gas and the lean gas supplied to the start catalysts 10, the combustion state of the cylinders 4 can be fixed. Thus, the drivability can be stable.

2nd EXAMPLE

Next, the second example of the control method of the exhaust valves 7 performed in the first embodiment will be described. The second example is similar to the first example in that the ECU 50 performs the control of switching the exhaust valves 7 to be operated and the exhaust valves 7 to be stopped. However, the second example is different from the first example in that the ECU 50 performs the control of switching the combustion states for each of the cylinders 4 performing the rich combustion and the lean combustion, at the time of performing the control of the exhaust valves 7. Namely, in the second example, the ECU 50 performs the control of switching the operation/stop of the exhaust valves 7 and switching the combustion states of the rich combustion/ the lean combustion in each of the cylinders 4, every predetermined time period at the time of the S-poisoning regeneration control.

FIGS. 4A and 4B are diagrams for specifically explaining the control method of the exhaust valves 7 according to the second example. Specifically, FIG. 4A shows the diagram similar to FIG. 2, and FIG. 4B shows the state after executing the control of the second example from the state shown in FIG. 4A.

In the second example, the ECU 50 performs the control of switching the operation/stop of the first exhaust valves 7a1 to 7d1 and the second exhaust valves 7a2 to 7d2 of the cylinders 4a to 4d, respectively, and at the same time performs the control of switching the combustion state of the cylinders 4a to 4d. Specifically, when the ECU 50 executes the control of the second example from the state shown in FIG. 4A, it stops the first exhaust valves 71a and 7d1 and operates the second exhaust valves 7a2 and 7d2 in the cylinders 4a and 4d, and operates the first exhaust valves 7b1 and 7c1 and stops the second exhaust valves 7b2 and 7c2 in the cylinders 4b and 4c, as shown in FIG. 4B. Also, at the same time with the above control of the exhaust valves 7, the ECU 50 switches the cylinders 4a and 4d from the rich combustion to the lean combustion, and switches the cylinders 4b and 4c from the lean combustion to the rich combustion. When the above control is performed, the switching of the rich gas and the lean gas supplied to the start catalysts 10 is not executed. Namely, the rich gas/the lean gas supplied to the start catalysts 10 are constant. Specifically, in both of the states shown in FIGS. 4A and 4B, the rich gas is supplied to the start catalyst 10a and the lean gas is supplied to the start catalyst 10b.

By performing the above-described control, the rich gas/ the lean gas supplied to the start catalysts 10 can be constant, and hence it can be effectively prevent the deterioration of the start catalyst 10 (either one of the start catalysts 10a and 10b) into which almost all the exhaust gas flows at the time of starting the internal combustion engine 1. Also, by switching the cylinders 4 performing the rich combustion and the lean combustion, the smoking in each cylinder 4 can be prevented.

The control method of the exhaust valves 7 according to the second example may be executed in combination with the control method of the exhaust valves 7 according to the first example described above. Namely, the control by which the combustion state is maintained and the operation/stop of the exhaust valves 7 is switched, and the control by which the operation/stop of the exhaust valves 7 is switched and at the same time the combustion state of the rich combustion/the lean combustion is also switched, may be executed in a manner being switched according to the situation.

3rd EXAMPLE

Next, the third example of the control method of the exhaust valves 7 performed in the first embodiment will be described. The third example is different from the first and second examples in that the ECU 50 performs the control of switching the exhaust valve to be operated and the exhaust valve to be stopped for each of the exhaust valves 7 provided in the cylinder which has performed the rich combustion at the time of the S-poisoning regeneration control, when the fuel cut control is performed during the S-poisoning regeneration control or within a predetermined time period from the end of the S-poisoning regeneration control. Namely, in the third example, at the time of the fuel cut control, the exhaust valves 7 are controlled such that all the exhaust gas (the exhaust gas of only air) is supplied to the start catalyst 10 to which the lean gas was supplied at the time of the S-poisoning regeneration control.

Figure 5B:
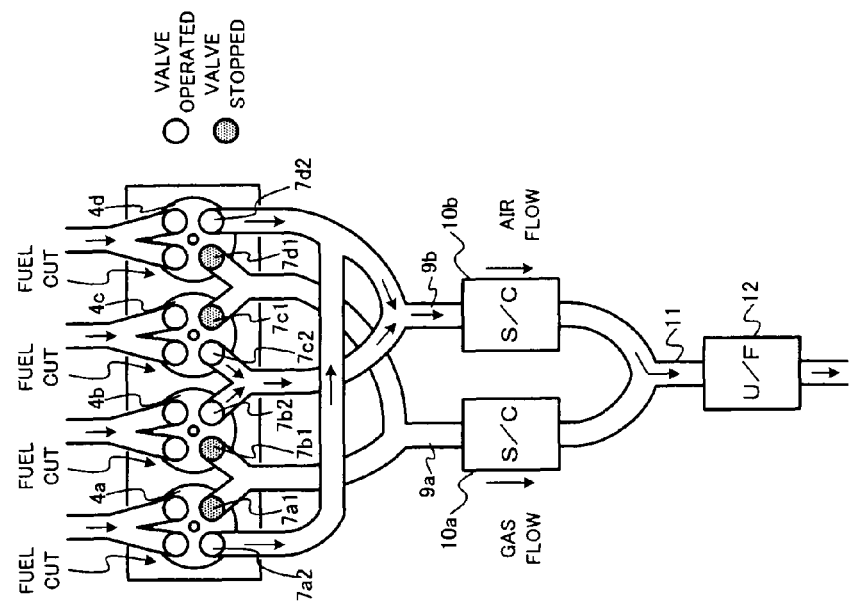
FIGS. 5A and 5B are diagrams for specifically explaining a method of controlling the exhaust valves according to a third example.
Figure 5A:
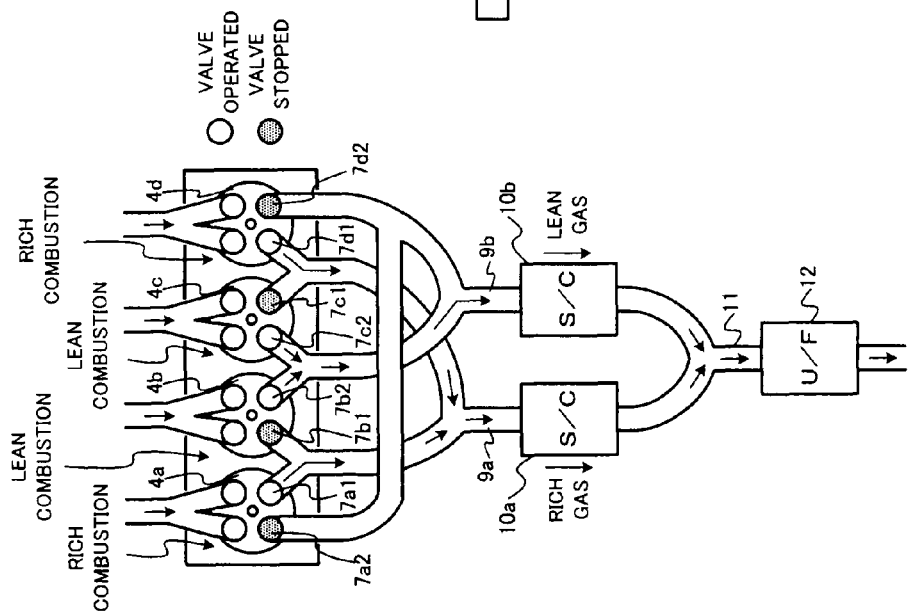

FIGS. 5A and 5B are diagrams for specifically explaining the control method of the exhaust valves 7 according to the third example. Specifically, FIG. 5A shows the diagram similar to FIG. 2, and FIG. 5B shows the state after executing the control according to the third example from the state shown in FIG. 5A.

In the third example, when performing the fuel cut control during the S-poisoning regeneration control or within a predetermined time period from the end of the S-poisoning regeneration control, the ECU 50 performs the control of switching the exhaust valve to be operated and the exhaust valve to be stopped, for each of the exhaust valves 7 provided in the cylinder 4 which has been performing the rich combustion. Specifically, when the fuel cut control is requested, the ECU 50 performs the control of stopping the fuel supply to all the cylinders 4*a* to 4*d* (i.e., fuel cut control), and, at the same time, performs the control of switching the exhaust valve to be operated and the exhaust valve to be stopped for each of the exhaust valves 7 provided in the cylinders 4*a* and 4*b* which has been performing the rich combustion at the time of the S-poisoning regeneration control. More specifically, when performing the control according to the third example from the state shown in FIG. 5A, the ECU 50 stops the first exhaust valves 7*a*1 and 7*d*1 and operates the second exhaust valves 7*a*2 and 7*d*2 in the cylinders 4*a* and 4*d*, as shown in FIG. 5B. In this case, the control of switching the operation/stop of the exhaust valves 7 is not executed in the cylinders 4*b* and 4*c*. When the above control is performed, as shown in FIGS. 5A and 5B, the exhaust gas does not flow into the start catalyst 10*a* to which the rich gas has been supplied at the time of the S-poisoning regeneration control, and all the exhaust gas (the exhaust gas of only air) is supplied to the start catalyst 10*b* to which the lean gas has been supplied at the time of the S-poisoning regeneration control.

By performing the above-described control, the exhaust gas of only air can be supplied to the start catalyst 10 to which the lean gas has been originally supplied. Therefore, it can be prevented, at the time of the fuel cut control, that the exhaust gas of only air is supplied to the start catalyst 10 to which the rich gas has been originally supplied, and the deterioration of the start catalyst 10 can be effectively prevented.

The control method of the exhaust valves 7 according to the third example may be executed in combination with the control method of the exhaust valves 7 according to the first and/or the second example.

4th EXAMPLE

Next, the fourth example of the control method of the exhaust valves 7 performed in the first embodiment will be described. In the fourth example, the ECU performs the control of switching the exhaust valves to be operated and the exhaust valves to be stopped for each of the exhaust valves 7 provided at the cylinder 4 which has been performing the lean combustion at the time of the S-poisoning regeneration control, at the time of restart of the internal combustion engine 1 (specifically, at the time of restart of economical-running). Namely, in the fourth example, when the operation of the internal combustion engine 1 is temporarily stopped and restarted for waiting the signal, etc., the exhaust valves 7 are controlled such that all the gas is supplied to the start catalyst 10 to which the rich gas has been supplied at the time of the S-poisoning regeneration control.

FIGS. 6A and 6B are diagrams for specifically explaining the control method of the exhaust valves according to the fourth example. Specifically, FIG. 6A shows a diagram similar to FIG. 2, and FIG. 6B shows the state after executing the control according to the fourth example from the state shown in FIG. 6A.

In the fourth example, the ECU 50 performs the control of switching the exhaust valve to be operated and the exhaust valve to be stopped for each of the exhaust valves 7 provided in the cylinder 4 which has been performing the lean combustion, at the time of restart of the internal combustion engine 1 for the economic-running (hereinafter referred to as "the economic-running restart"). Specifically, when the economic-running restart is requested, the ECU 50 performs the control of making all the cylinders 4*a* to 4*d* perform the rich combustion, and performs the control of switching the exhaust valve to be operated and the exhaust valve to be stopped for each of the exhaust valves 7 provided in the cylinders 4*b* and 4*c* which has been performing the lean combustion at the time of the S-poisoning regeneration control, at the time of performing the economic-running restart. More specifically, when executing the control according to the fourth example from the state shown in FIG. 6A, the ECU 50 operates the first exhaust valves 7*b*1 and 7*c*1 and stops the second exhaust valves 7*b*2 and 7*c*2 in the cylinders 4*b* and 4*c*, as shown in FIG. 6B. In this case, the control of switching the operation/stop of the exhaust valves 7 is not executed in the cylinders 4*a* and 4*d*. When the above control is performed, as shown in FIGS. 6A and 6B, the gas does not flow into the start catalyst 10*b* to which the lean gas has been supplied at the time of the S-poisoning regeneration control, and all the gas (rich gas) is supplied to the start catalyst 10*a* to which the rich gas has been supplied at the time of the S-poisoning regeneration control.

By performing the control according to the fourth example as described above, all the rich gas can be supplied to the start catalyst 10, to which the rich gas has been originally supplied, at the time of the economic-running restart. The start catalyst 10 to which the rich gas has been originally supplied has relatively small oxygen storage capacity, and hence high NOx purification rate can be expected. Therefore, by supplying all the rich gas to the start catalyst 10, the deterioration of NOx emission can be effectively suppressed. Further, by the control according to the fourth example, it can be prevented that, at the time of the economic-running restart, the rich gas is supplied to the start catalyst 10 to which the lean gas has been originally supplied, and the deterioration of the start catalyst 10 can be effectively prevented.

In the above description, while the control of switching the operation/stop of the exhaust valves 7 provided in the cylinder 4 which has been performing the lean combustion at the time of the S-poisoning regeneration control is performed at the time of the economic-running restart, the present invention is not limited to this example. In another example, the ECU 50 may perform the control of switching the exhaust valve to be operated and the exhaust valve to be stopped for each of the exhaust valves 7 provided in the cylinder 4 which has been performing the lean combustion at the time of the S-poisoning regeneration control, at the time when the S-poisoning regeneration control is switched to the control for stoichiometric driving (i.e., the control to make all the cylinders 4*a* to 4*d* perform the stoichiometric combustion). Namely, the control of switching the operation/stop of the exhaust valves 7 provided in the cylinder 4 which has been performing the lean combustion at the time of the S-poisoning regeneration control may be executed at the time of the economic-running restart and/or at the time of switching from the S-poisoning regeneration control to the control for the stoichiometric driving.

By performing the above control at the time of switching all the cylinders 4a to 4d to the stoichiometric combustion, all the gas ejected during the stoichiometric driving can be supplied to the start catalyst 10 to which the rich gas has been originally supplied. Therefore, since the start catalyst 10 to which the rich gas has been originally supplied has a relatively small oxygen storage capacity and can expect high NOx purification rate, the deterioration of NOx emission can be effectively suppressed by supplying all the gas ejected during the stoichiometric driving to the start catalyst 10.

The control method of the exhaust valves 7 according to the fourth example may be executed in combination with the control method of the exhaust valves 7 according to at least one of the first to third examples. In such a case, if the fuel cut is being performed at the time of the economic-running restart, it is preferable that the control according to the third example is executed with high priority.

Modified Examples

In the above-described embodiment, there is described the control method for the exhaust valves 7 of the internal combustion engine 1 (straight 4 cylinder engine) having four cylinders 4a to 4d. However, the application of the present invention is not limited to this example. In another example, the control method similar to the above-described method may be executed for the exhaust valves of an internal combustion engine (straight 6 cylinder engine) having six cylinders. Namely, the control to the exhaust valves can be performed such that only one of the rich gas and the lean gas flows into the respective one of the start catalysts 10 at the time of the S-poisoning regeneration control.

Figure 7:
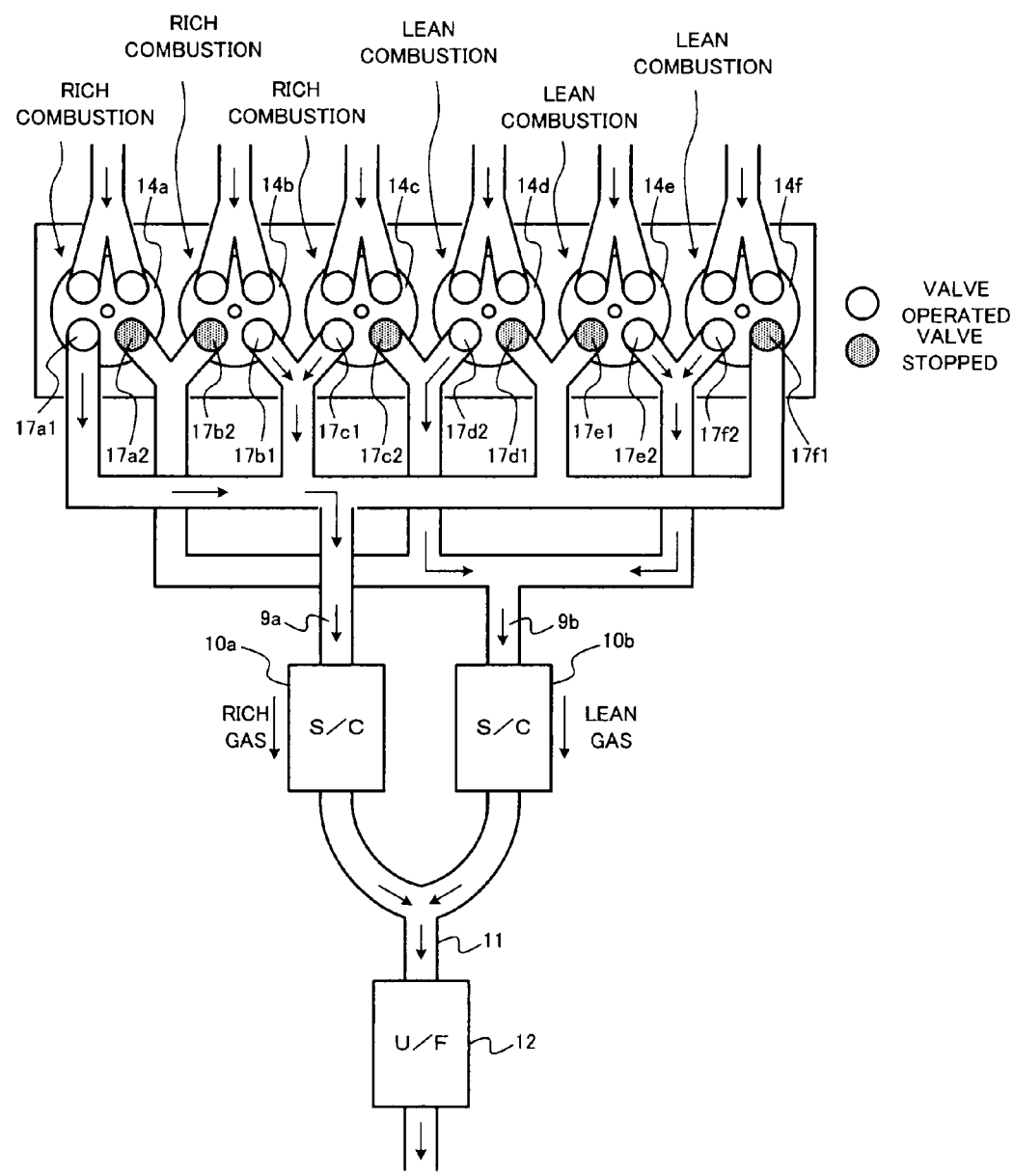
FIG. 7 is a diagram for specifically explaining a control method for an internal combustion engine formed by six cylinders.

FIG. 7 is a diagram for specifically explaining the control method of the exhaust valves for the internal combustion engine 1a having six cylinders 14a to 14f (first exhaust valves 17a1 to 17f1 and second exhaust valves 17a2 to 17f2, and hereinafter simply referred to as "exhaust valves 17"). In FIG. 7, the same reference numbers are applied to the same constitutional elements as those of FIG. 2. Also, the internal combustion engine 1a explodes in an order of the cylinder 14a, the cylinder 14e, the cylinder 14c, the cylinder 14f, the cylinder 14b and the cylinder 14d. Further, the control of the internal combustion engine 1a is executed by the above-mentioned ECU 50.

In this case, the ECU 50 makes the cylinders 14a to 14c (three cylinders on the left side) perform the rich combustion and makes the cylinders 14d to 14f (three cylinders on the right side) perform the lean combustion, thereby to execute the S-poisoning regeneration control. Then, when performing the S-poisoning regeneration control, the ECU 50 controls the exhaust valves 7 such that the rich gas from the cylinders 14a to 14c performing the rich combustion is wholly supplied to the start catalyst 10a and such that the lean gas from the cylinders 14d to 14f performing the lean combustion is wholly supplied to the start catalyst 10b. Specifically, the ECU 50 operates the first exhaust valves 17a1, 17b1 and 17c1 and stops the second exhaust valves 17a2, 17b2 and 17c2 for the cylinders 14a to 14c performing the rich combustion. On the other hand, the ECU 50 stops the first exhaust valves 17d1, 17e1 and 17f1 and operates the second exhaust valves 17d2, 17e2 and 17f2 for the cylinders 14d to 14f performing the lean combustion.

By performing such a control, it is possible to supply only the rich gas to the start catalyst 10a and only the lean gas to the start catalyst 10b, at the time of the S-poisoning regeneration control. Namely, it is possible to suppress that the rich gas and the lean gas flow into the start catalysts 10a and/or 10b with the amount ratio of "1:1". Therefore, it is possible to suppress that the start catalyst 10 becomes remarkably high in temperature to be deteriorated, and to suppress the temperature rising failure of the U/F catalyst 12 due to the lowered heat generation.

At least one of the control methods of the exhaust valves 7 according to the above-described first to fourth examples may be similarly executed for the internal combustion engine 1a having six cylinders 14a to 14f.

<2nd Embodiment>

Next, the second embodiment of the present invention will be described.

The second embodiment is different from the first embodiment in that the control is performed for the internal combustion engine in which the start catalyst 10a is provided only on the first exhaust passage 9a communicating with the first exhaust valves 7a1 to 7d1 and the start catalyst 10b is not provided on the second exhaust passage 9b communicating with the second exhaust valves 7a2 to 7d2. Specifically, in the second embodiment, at the time of the S-poisoning regeneration control, one of the first exhaust valves 7a1 to 7d1 and the second exhaust valves 7a2 to 7d2 respectively provided on the cylinders 4a to 4d is stopped and the other is operated so that the exhaust gas does not flow into the start catalyst 10a provided on the first exhaust passage 9a.

Figure 8:
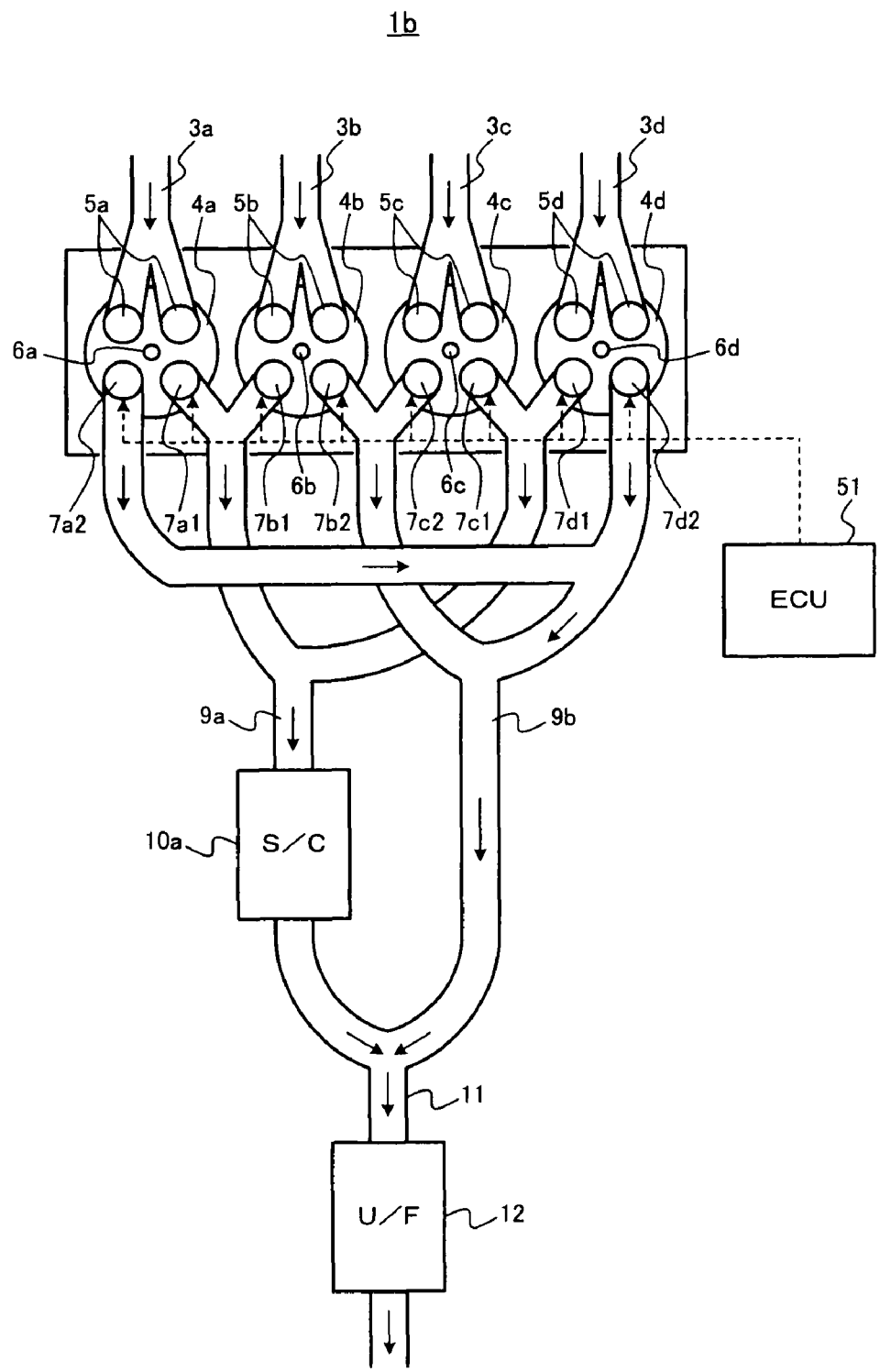
FIG. 8 is a diagram showing a schematic configuration of an internal combustion engine according to a second embodiment.

FIG. 8 shows a schematic configuration of the internal combustion engine 1b according to the second embodiment. In FIG. 8, the solid line arrows show the examples of the gas flow, and the broken line arrows show the input/output of the signals. The same reference numerals are applied to the constitutional elements same as those of the constitutional elements shown in FIG. 1.

In the internal combustion engine 1b according to the second embodiment, the start catalyst 10a is provided on the first exhaust passage 9a communicating with the first exhaust valves 7a1 to 7d1, and the start catalyst 10b is not provided on the second exhaust passage 9b communicating with the second exhaust valves 7a2 to 7d2. Namely, the internal combustion engine 1b does not have the start catalyst 10b described above. Also, the internal combustion engine 1b is controlled by the ECU 51. Specifically, the ECU 51 mainly execute the S-poisoning regeneration control for recovering from the S-poisoning of the U/F catalyst 12, and executes the control for the first exhaust valves 7a1 to 7d1 and the second exhaust valves 7a2 to 7d2 at the time of the S-poisoning regeneration control.

Figure 9:
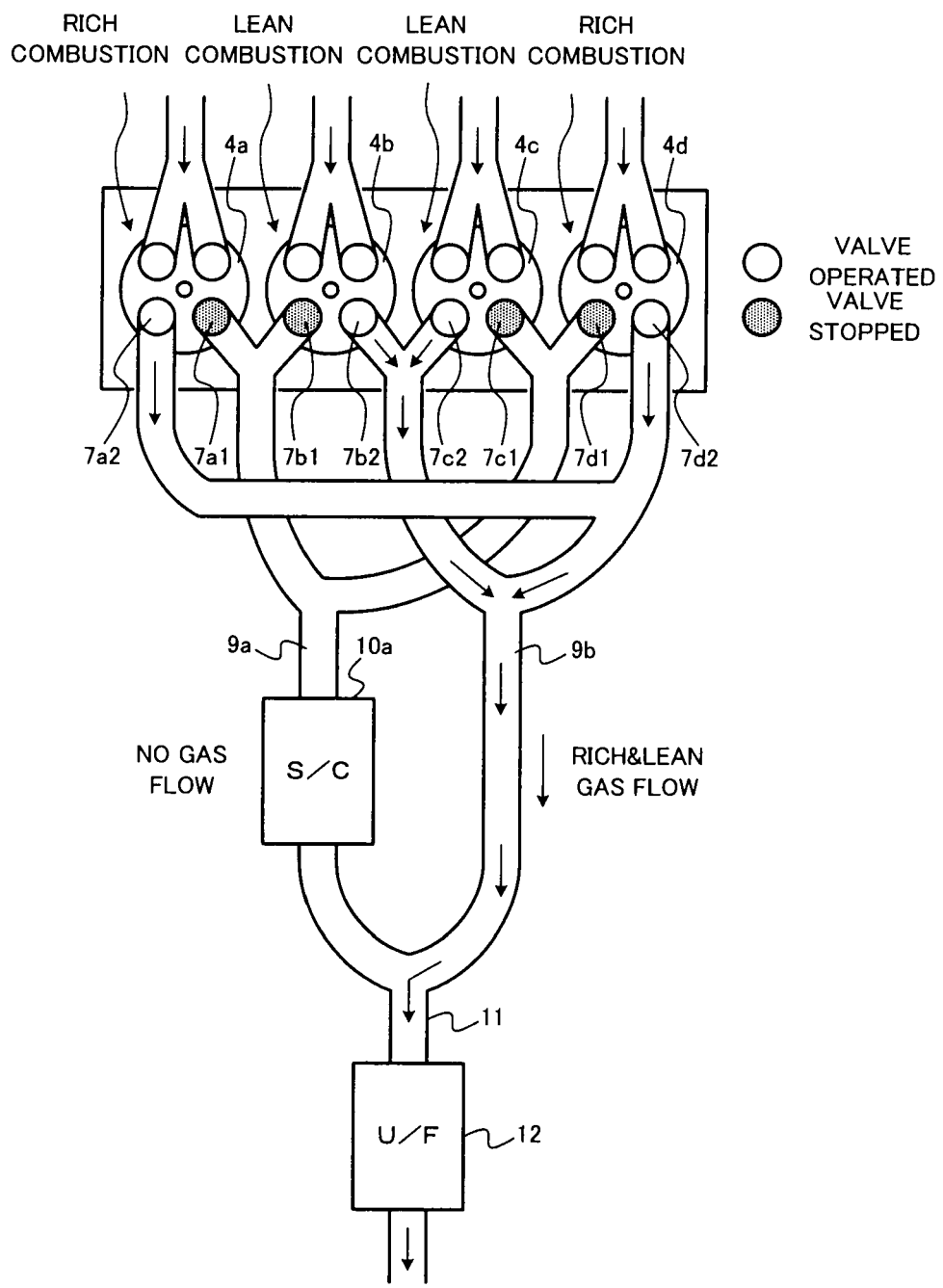
FIG. 9 is a diagram for specifically explaining a method of controlling exhaust valves according to the second embodiment.

FIG. 9 is a diagram for specifically explaining the control method of the exhaust valves 7 according to the second embodiment. FIG. 9 shows the schematic configuration of the internal combustion engine 1b similar to that shown in FIG. 8.

In this case, the ECU 51 makes the cylinders 4a and 4d perform the rich combustion and makes the cylinders 4b and 4c perform the lean combustion. Namely, in order to recover from the S-poisoning of the U/F catalyst 12, the ECU 51 executes the S-poisoning regeneration control. When performing the S-poisoning regeneration control, the ECU 51 controls the exhaust valves 7 such that the exhaust gas from all the cylinders 4a to 4d wholly passes the second exhaust passage 9b, i.e., the exhaust gas is not supplied to the start catalyst 10a on the first exhaust passage 9a. Specifically, the ECU 51 stops (i.e., closes) the first exhaust valves 7a1 to 7d1 and operates (i.e., opens) the second exhaust valves 7a2 to 7d2 in the cylinders 4a to 4d.

By performing the control to the exhaust valves 7 in this way, all the exhaust gas can be flown to the second exhaust passage 9b on which the start catalyst 10a is not provided, at the time of the S-poisoning regeneration control. Namely, the supply of the exhaust gas to the start catalyst 10a can be cut off at the time of the S-poisoning regeneration control. Thereby, it can be suppressed that the exhaust gas reacts in the start catalyst 10a to be consumed, and the S-poisoning regeneration efficiency for the U/F catalyst 12 can be enhanced (Namely, the temperature of the U/F catalyst 12 can be effectively risen). In comparison with the case in which the S-poisoning regeneration control is performed with supplying the exhaust gas also to the start catalyst 1a, by performing the above control, the temperature control width of the U/F catalyst 12 with respect to the control width of A/F at the time of the S-poisoning regeneration control can be broadened.

Figure 10:
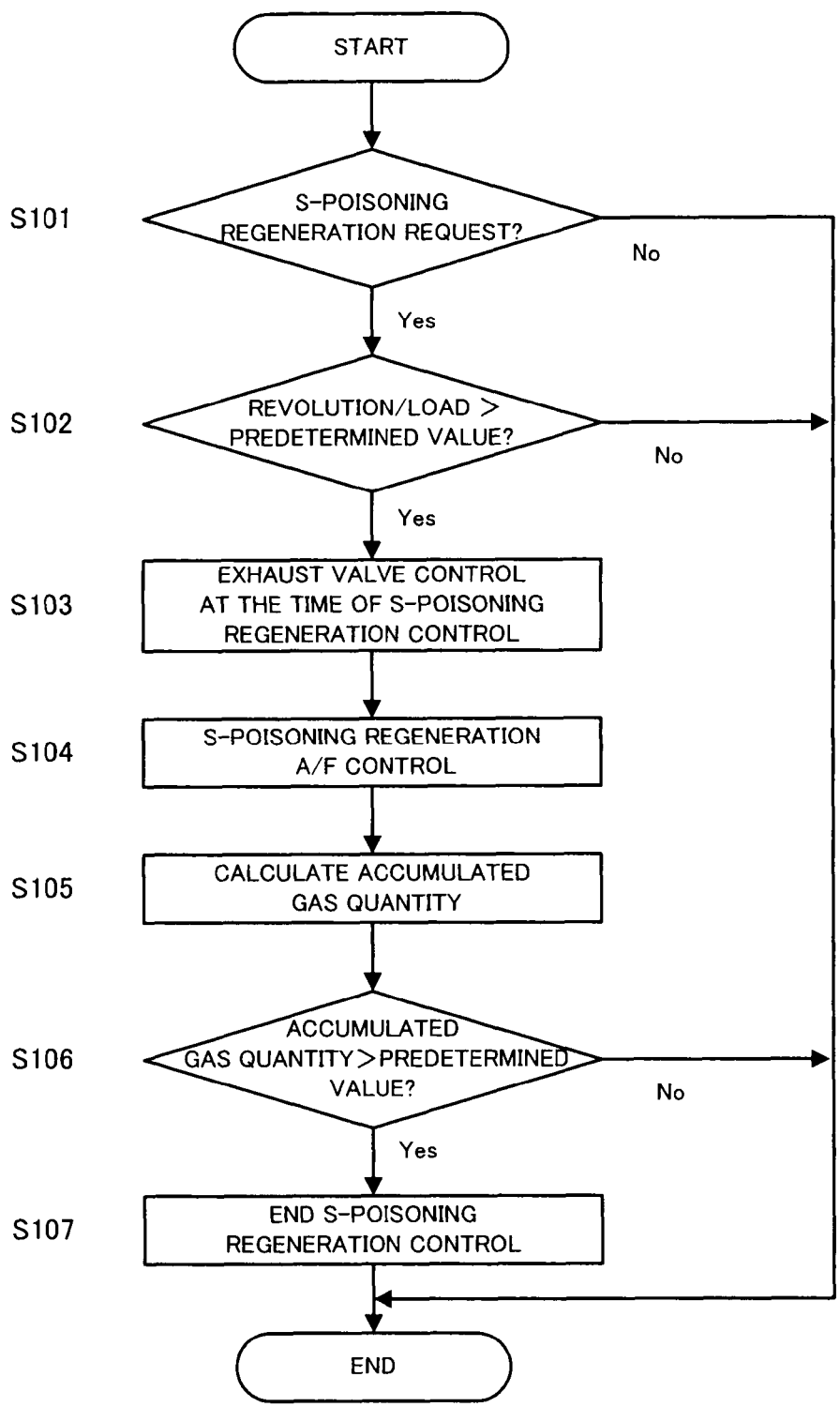
FIG. 10 is a flowchart of a sulfur poisoning regeneration control process according to the second embodiment.

Next, the S-poisoning regeneration control according to the second embodiment will be described with reference to FIG. 10. FIG. 10 is a flowchart showing the S-poisoning regeneration control process according to the second embodiment. This process is repeatedly executed by the ECU 51.

First, in step S101, the ECU 51 determines whether or not the S-poisoning regeneration control is requested. Here, the ECU 51 determines whether or not to perform the S-poisoning regeneration control. In one example, the ECU 51 determines whether or not to perform the S-poisoning regeneration control by estimating the amount of sulfur (S) in the U/F catalyst 12. In this case, the ECU 51 estimates the amount of sulfur (S) in the U/F catalyst 12 based on the travel distance and/or the amount of sulfur in the fuel. In another example, the ECU 51 determines whether or not to perform the S-poisoning regeneration control by estimating the purifying ability of the U/F catalyst 12. In this case, the ECU 51 estimates the purifying ability of the U/F catalyst 12 based on the output from the NOx sensor provided on the exhaust passage 11. When the S-poisoning regeneration control is requested (step S101;Yes), the process goes to step S102. When the S-poisoning regeneration control is not requested (step S101;No), the process goes out of the flow.

In step S102, the ECU 51 determines whether the number of revolution/load in the internal combustion engine 1b is equal to or larger than a predetermine value or not. The reason to perform this determination is that the internal combustion engine 1b is desired to be operating with the number of revolution/load of certain degree so as to rise the temperature of the U/F catalyst 12 to a desired temperature by the S-poisoning regeneration control. When the number of revolution/load is equal to or larger than the predetermined value (step S102; Yes), the process goes to step S103. When the number of revolution/load is smaller than the predetermined value (step S102; No), the process goes out of the flow.

In step S103, the ECU 51 executes the control of the exhaust valves 7 (hereinafter referred to as "the exhaust valve control at the time of the S-poisoning regeneration control") so that the exhaust gas does not flow into the start catalyst 10a in the S-poisoning regeneration control. Specifically, as the exhaust valve control at the time of the S-poisoning regeneration control, the ECU 51 stops one of the first exhaust valves 7a1 to 7d1 and the second exhaust valves 7a2 to 7d2 respectively provided on the cylinders 4a to 4d and operates the other of them. Specifically, the ECU 51 closes the first exhaust valves 7a1 to 7d1 and opens the second exhaust valves 7a2 to 7d2. Then, the process goes to step S104.

In step S104, the ECU 51 executes the A/F control (hereinafter referred to as "S-poisoning regeneration A/F control"), for recovery from the S-poisoning of the U/F catalyst 12. Specifically, as the S-poisoning regeneration A/F control, the ECU 51 makes the cylinders 4a and 4d perform the rich combustion and makes the cylinders 4b and 4c perform the lean combustion. Then, the process goes to step S105.

In step S105, the ECU 51 calculates an accumulated gas quantity at the time of the S-poisoning regeneration control. Specifically, the ECU 51 accumulates the gas quantity (intake air quantity) from the start of the S-poisoning regeneration control. Then, the process goes to step S106.

In step S106, the ECU 51 determines whether or not the accumulated gas quantity calculated in step S105 is equal to or larger than the predetermined value. Here, the ECU 51 determines whether or not the execution of the S-poisoning regeneration control can be ended. When the accumulated gas quantity is equal to or larger than the predetermined value (step S106; Yes), the process goes to step S107. In step S107, the ECU 51 ends the execution of the S-poisoning regeneration control. Then, the process goes out of this flow. On the other hand, if the accumulated gas quantity is smaller than the predetermined value (step S106; No), the process goes out of this flow. In this case, the S-poisoning regeneration control is not ended, but is continued.

By the S-poisoning regeneration control process according to the second embodiment as described above, the S-poisoning regeneration efficiency for the U/F catalyst 12 can be enhanced. Namely, the temperature of the U/F catalyst 12 can be effectively risen. Also, according to the second embodiment, it is possible to broaden the temperature control width of the U/F catalyst 12 with respect to the A/F control width at the time of the S-poisoning regeneration control.

<3rd Embodiment>

Next, the third embodiment of the present invention will be described.

The third embodiment is similar to the second embodiment in that the control is performed for the internal combustion engine in which the start catalyst 10a is provided only on the first exhaust passage 9a and the start catalyst 10b is not provided on the second exhaust passage 9b. However, the third embodiment is different from the second embodiment in that the control (rich-spike control) for forcibly making the air/fuel ratio to be rich in order to reduce NOx stored in the U/F catalyst 12 is executed instead of the S-poisoning regeneration control, and the control of the exhaust valves 7 is performed at the time of the rich-spike control. Specifically, in the third embodiment, at the time of the rich-spike control, one of the first exhaust valves 7a1 to 7d1 and the second exhaust valves 7a2 to 7d2 respectively provided on the cylinders 4a to 4d are stopped and the other are operated so that the exhaust gas does not flow into the start catalyst 10a provided on the first exhaust passage 9a.

In the third embodiment, the control is performed for the internal combustion engine 1b (see. FIG. 8) having the same configuration as the second embodiment described above. In addition, the control according to the third embodiment is executed by the ECU 51 described above.

Figure 11:
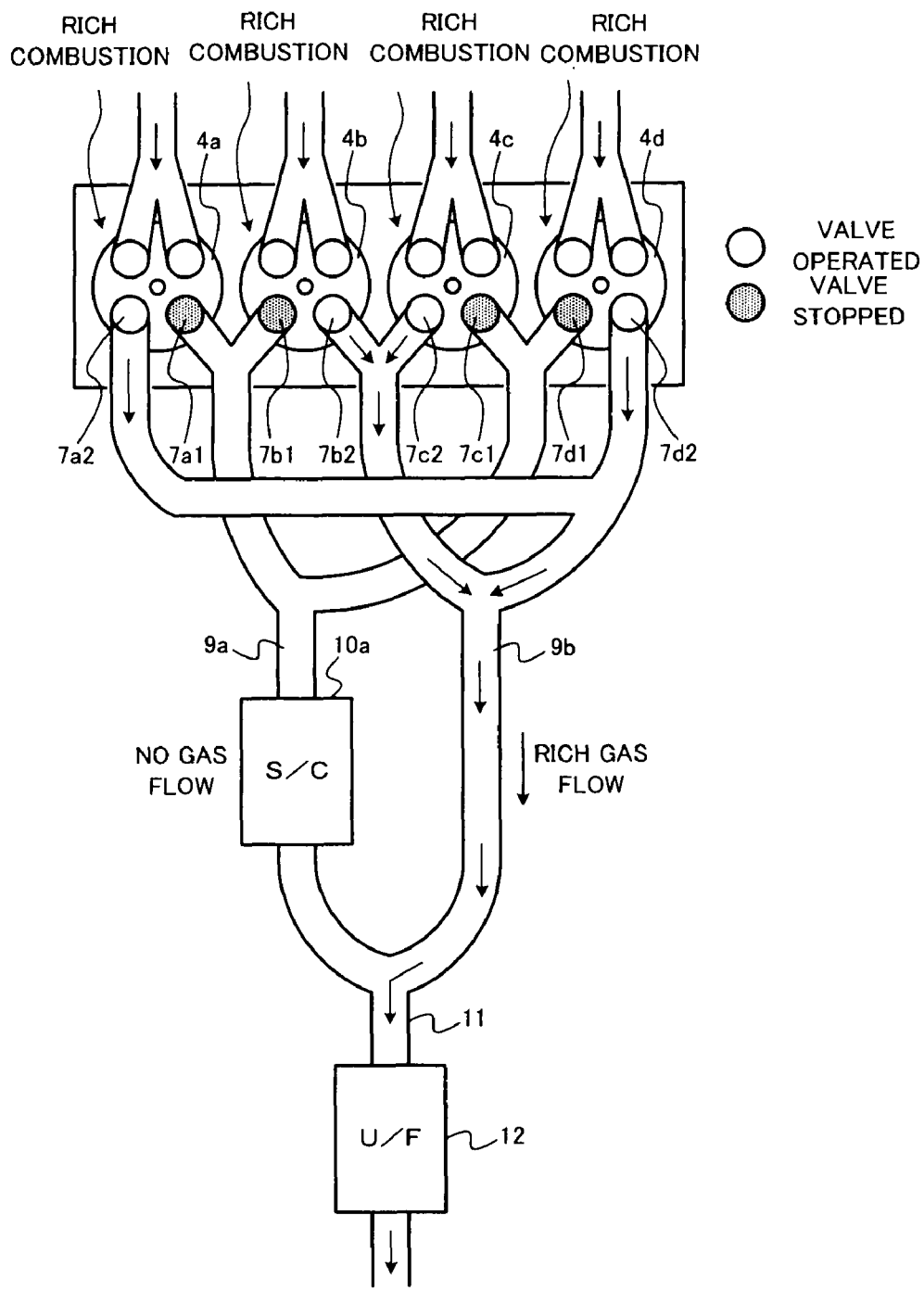
FIG. 11 is a diagram for specifically explaining a method of controlling exhaust valves according to the third embodiment.

FIG. 11 is a diagram for specifically explaining the control method of the exhaust valves 7 according to the third embodiment. FIG. 11 shows the schematic configuration of the internal combustion engine 1b similar to that shown in FIG. 8.

In this case, the ECU 51 executes the rich-spike control by making all the cylinders 4a to 4d perform the rich combustion, so as to perform NOx reduction of the U/F catalyst 12. When performing the rich-spike control, the ECU 51 controls the exhaust valves 7 such that the exhaust gas from all the cylinders 4a to 4d wholly passed through the second exhaust passage 9b, i.e., the exhaust gas is not supplied to the start catalyst 10a on the first exhaust passage 9a. Specifically, the ECU 51 stops (i.e., closes) the first exhaust valves 7a1 to 7d1 and operates (i.e., opens) the second exhaust valves 7a2 to 7d2 in the cylinders 4a to 4d.

By performing the control to the exhaust valves 7 in this way, all the exhaust gas can be flown to the second exhaust passage 9b on which the start catalyst 10a is not provided, at the time of the rich-spike control. Namely, at the time of the rich-spike control, the exhaust gas supply to the start catalyst 10a can be cut off. By this, it can be suppressed that the reducer (HC, CO, etc.) is consumed in the start catalyst 10a. As a result, the reducer can be efficiently supplied to the U/F catalyst 12, and the NOx reduction efficiency for the U/F catalyst 12 can be enhanced. In addition, the deterioration of the fuel consumption at the time of the rich-spike can be suppressed. In comparison with the case in which the rich-spike control is performed with supplying the exhaust gas to the start catalyst 10a, by the third embodiment, the rich degree at the time of the rich-spike control can be relatively small.

Figure 12:
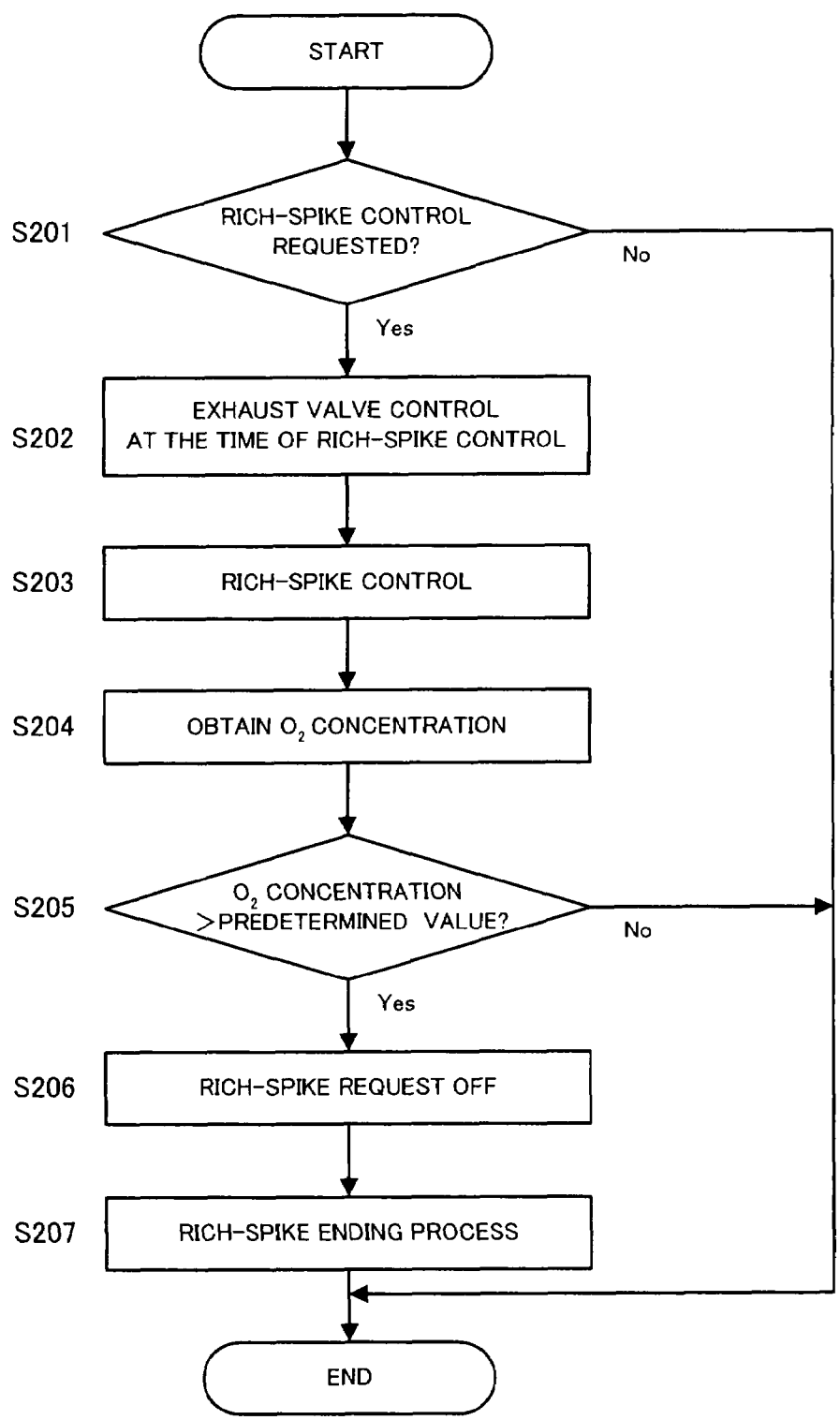
FIG. 12 is a flowchart of rich spike control process according to the third embodiment.

Next, the rich-spike control according to the third embodiment will be described with reference to FIG. 12. FIG. 12 is a flowchart showing the rich-spike control process according to the third embodiment. This process is repeatedly executed by the ECU 51.

First, in step S201, the ECU 51 determines whether or not the rich-spike control is requested. Here, the ECU 51 determines whether or not to perform the rich-spike control. For example, the ECU 51 determines whether or not to execute the rich-spike control based on the elapsed time from the last execution of the rich-spike control or NOx quantity in the exhaust gas. When the rich-spike control is requested (step S201; Yes), the process goes to step S202. When the rich-spike control is not requested (step S201; No), the process goes out of the flow.

In step S202, the ECU 51 executes the control of the exhaust valves 7 (hereinafter referred to as "the exhaust valve control at the time of the rich-spike control") so that the exhaust gas does not flow into the start catalyst 10a, at the time of the rich-spike control. Specifically, as the exhaust valve control at the time of the rich-spike control, the ECU 51 performs the control of stopping one of the first exhaust valve 7a1 to 7d1 and the second exhaust valves 7a2 to 7d2 respectively provided on the cylinders 4a to 4d and operating the other. Specifically, the ECU 51 closes the first exhaust valves 7a1 to 7d1 and opens the second exhaust valves 7a2 to 7d2. Then, the process goes to step S203.

In step S203, the ECU 51 executes the rich-spike control so as to reduce NOx stored in the U/F catalyst 12. Specifically, the ECU 51 performs the rich combustion in the cylinders 4a to 4d. More specifically, the ECU 51 sets the throttle valve to the requested throttle opening degree at the time of the rich-spike control (specifically controls to decreases the throttle opening degree), and injects the fuel corresponding to the requested injection quantity for performing the rich-spike control. After finishing the above process, the process goes to step S204.

In step S204, the ECU 51 obtains the oxygen concentration from the $O_2$ sensor provided on the exhaust passage 11 at the downstream of the U/F catalyst 12. This is to determine the ending of the rich-spike control in the following process. Then, the process goes to step S205.

In step S205, the ECU 51 determines whether the oxygen concentration obtained in step S204 is equal to or larger than a predetermined value. When the oxygen concentration is equal to or larger than the predetermined value (step S205; Yes), the process goes to step S206. In this case, it is presumed that the U/F catalyst 12 is in the rich state. Namely, it is presumed to be the state that the rich spike control can be ended. Therefore, the ECU 51 sets the rich-spike request to OFF in step S206. Then, the process goes to step S207. On the other hand, when the oxygen concentration is smaller than the predetermined value (step S205; No), the process goes out of the flow. In this case, it is presumed that the U/F catalyst 12 is not in the rich state. Namely, it is presumed to be the state that the rich-spike control cannot be ended. Therefore, in this case, the rich-spike control is not ended, but is continued.

In step S207, the ECU 51 executes the process (hereinafter referred to as "rich-spike ending process") to end the rich-spike control. Specifically, as the rich-spike ending process, the ECU 51 performs the control of the throttle opening degree, the fuel injection quantity and the exhaust valves 7. More specifically, the ECU 51 sets the throttle opening degree to the requested throttle opening degree at the time of lean driving, and injects the fuel corresponding to the requested fuel injection quantity at the time of lean driving. Further, the ECU 51 performs the control of the exhaust valves 7 such that the exhaust gas flow in a base state set in advance is achieved. When the above process ends, the process goes out of the flow.

By the rich-spike control process according to the third embodiment described above, it can be suppressed that the reducer is consumed in the start catalyst 10a, the NOx reduction efficiency for the U/F catalyst 12 can be enhanced, and the deterioration of the fuel consumption at the time of the rich-spike control can be suppressed.

Industrial Applicability

The present invention can be used for the internal combustion engine in which plural exhaust valves are provided for each of a plurality of cylinders and an exhaust passage is connected to each plurality of exhaust valves.

The invention claimed is:

1. A control device of an internal combustion engine, which controls the internal combustion engine performing lean burn and comprising plural cylinders and an exhaust system, the exhaust system comprising:

first exhaust valves and second exhaust valves provided in each of the plural cylinders;

a first exhaust passage communicating with the first exhaust valves;

a second exhaust passage communicating with the second exhaust valves;

a first exhaust gas purifying catalyst provided at least one of the first exhaust passage and the second exhaust passage; and a second exhaust gas purifying catalyst provided on an exhaust passage downstream of a junction of the first exhaust passage and the second exhaust passage, the control device comprising:

a control unit implemented by a microprocessor and programmed to control the first exhaust valves and the second exhaust valves and to direct rich combustion more to the second exhaust gas purifying catalyst than to the first exhaust gas purifying catalyst, when a part of the plural cylinder performs the rich combustion.

2. The control device of the internal combustion engine according to claim 1, wherein the control unit is programmed to perform a S-poisoning regeneration control in which the control unit is programmed to make a part of the plural cylinders perform stoichiometric combustion or rich combustion and make a remainder of the plural cylinders perform lean combustion, and wherein the control unit is further programmed to stop one of the first exhaust valves and the second exhaust valves provided in each of the plural cylinders and to operate the other of the first exhaust valves and the second exhaust valves, at a time of the S-poisoning regeneration control, such that only one of exhaust gas from the cylinder performing the stoichiometric combustion or the rich combustion and exhaust gas from the cylinder performing the lean combustion flows into the first exhaust gas purifying catalyst.

3. The control device of the internal combustion engine according to claim 1, wherein the control unit is programmed to perform a control of switching an exhaust valve to be operated and an exhaust valve to be stopped, at every time period, for each of the first exhaust valves and the second exhaust valves provided on the plural cylinders, while maintaining a combustion state of the cylinder performing the stoichiometric combustion or the rich combustion and the cylinder performing the lean combustion.

4. The control device of the internal combustion engine according to claim 3, wherein the control unit is programmed to switch the combustion state for each of the cylinder performing the stoichiometric combustion or the rich combustion and the cylinder performing the lean combustion, when performing the control of switching an exhaust valve to be operated and an exhaust valve to be stopped.

5. The control device of the internal combustion engine according to claim 2, wherein the control unit is programmed to perform a control of switching an exhaust valve to be operated and an exhaust valve to be stopped, for each of the first exhaust valves and the second exhaust valves provided in the cylinder performing the stoichiometric combustion or the rich combustion, when performing a fuel cut control during the S-poisoning regeneration control or within a predetermined time period from an end of the S-poisoning regeneration control.

6. The control device of the internal combustion engine according to claim 2, wherein the control unit is programmed to perform a control of switching an exhaust valve to be operated and an exhaust valve to be stopped, for each of the first exhaust valves and the second exhaust valves provided in the cylinder performing the lean combustion, when performing a restart of the internal combustion engine for an economic running.

7. The control device of the internal combustion engine according to claim 2, wherein the control unit is programmed to perform a control of switching an exhaust valve to be operated and an exhaust valve to be stopped, for each of the first exhaust valves and the second exhaust valves provided in the cylinder performing the lean combustion, when switching the combustion state of all the cylinders from the combustion state at the time of the S-poisoning regeneration control to the stoichiometric combustion.

8. The control device of the internal combustion engine according to claim 1,
wherein the control unit is programmed to perform a S-poisoning regeneration control in which the control unit is programmed to make a part of the plural cylinders perform stoichiometric combustion or rich combustion and makes remainder of the plural cylinders perform lean combustion so as to recover sulfur poisoning of the second exhaust purifying catalyst, and
wherein the control unit is programmed to stop one of the first exhaust valves and the second exhaust valves provided in each of the plural cylinders and to operate the other of the first exhaust valves and the second exhaust valves, at a time of the S-poisoning regeneration control, such that exhaust gas does not flow into the first exhaust gas purifying catalyst.

9. The control device of the internal combustion engine according to claim 1,
wherein the control unit is programmed to perform a rich-spike control in which the control unit is programmed to make all the cylinder perform the rich combustion so as to perform NOx reduction of the second exhaust gas purifying catalyst, and
wherein the control unit is programmed to stop one of the first exhaust valves and the second exhaust valves provided in each of the plural cylinders and to operate the other of the first exhaust valves and the second exhaust valves, at a time of the rich-spike control, such that exhaust gas does not flow into the first exhaust gas purifying catalyst.

10. A control device of an internal combustion engine, which controls the internal combustion engine performing lean burn and comprising plural cylinders and an exhaust system, the exhaust system including first exhaust valves and second exhaust valves provided in each of the plural cylinders, a first exhaust passage communicating with the first exhaust valves, a second exhaust passage communicating with the second exhaust valves, a first exhaust gas purifying catalyst provided at least one of the first exhaust passage and the second exhaust passage, and a second exhaust gas purifying catalyst provided on an exhaust passage downstream of a junction of the first exhaust passage and the second exhaust passage, the control device comprising:
means for making rich combustion occur more to the second exhaust gas purifying catalyst than to the first exhaust gas purifying catalyst, when a part of the plural cylinder performs the rich combustion.

* * * * *